ized into extensible Channels, each of which captures

(12) United States Patent
Vorne et al.

(10) Patent No.: US 10,909,480 B2
(45) Date of Patent: *Feb. 2, 2021

(54) METHOD AND SYSTEM FOR ORGANIZING AND STORING MANUFACTURING PROCESS INFORMATION

(71) Applicant: Vorne Industries, Inc., Itasca, IL (US)

(72) Inventors: Ramon A. Vorne, Wood Dale, IL (US); Phillip Howell, Chicago, IL (US); Benjamin D. Saks, Wood Dale, IL (US); Chad E. Barth, Crystal Lake, IL (US)

(73) Assignee: Vorne Industries, Inc., Itasca, IL (US)

( * ) Notice: Subject to any disclaimer, the term of this patent is extended or adjusted under 35 U.S.C. 154(b) by 250 days.

This patent is subject to a terminal disclaimer.

(21) Appl. No.: 15/857,840

(22) Filed: Dec. 29, 2017

(65) Prior Publication Data

US 2018/0121839 A1 May 3, 2018

Related U.S. Application Data

(63) Continuation of application No. 14/275,095, filed on May 12, 2014, now Pat. No. 9,864,961.
(Continued)

(51) Int. Cl.
*G06F 16/21* (2019.01)
*G06Q 10/06* (2012.01)
*G06Q 50/04* (2012.01)

(52) U.S. Cl.
CPC .............. *G06Q 10/06* (2013.01); *G06F 16/21* (2019.01); *G06Q 50/04* (2013.01); *Y02P 90/30* (2015.11)

(58) Field of Classification Search
None
See application file for complete search history.

(56) References Cited

U.S. PATENT DOCUMENTS

2006/0282189 A1* 12/2006 Akisawa .......... G05B 19/41865
700/110
2009/0320047 A1* 12/2009 Khan .................... G06F 16/22
(Continued)

FOREIGN PATENT DOCUMENTS

KR 20020066108 A 8/2002

OTHER PUBLICATIONS

Perera, Charith, et al. "Dynamic configuration of sensors using mobile sensor hub in Internet of things paradigm," Intellegent Sensors, Sensor Networks and Information Processing, 2013 IEEE Eighth International Conference on, IEE, Apr. 2, 2013, p. 473-478.
(Continued)

*Primary Examiner* — Son T Hoang
(74) *Attorney, Agent, or Firm* — Bishop, Diehl & Lee, Ltd.

(57) ABSTRACT

A method and system for capturing, organizing, storing, and analyzing manufacturing process information, with storage and performance characteristics suitable for use in resource-constrained embedded devices. Process information is organized into extensible Channels, each of which captures information stored as extensible Events, each of which may include Metric, Category Value, Annotation, and System Fields. Shared Boundaries between Channels make it easier to organize, store, interrelate, analyze, and explore information. Channel Boundary Relationships (e.g., Coupling, Fragmenting, Projecting, and Aggregating) create shared Boundaries; and can create, or be combined to create, sets of Channels that share Boundaries (referred to as a Slice Set). Shared Boundaries and Channel Boundary Relationships facilitate rule-based traversal of Exploration Hierarchies constructed from Channels, Categories, and Metrics, which enable users to view, analyze, interpret, understand, and
(Continued)

otherwise benefit from Metrics and other information while traversing groups of Categories.

22 Claims, 13 Drawing Sheets

Related U.S. Application Data

(60) Provisional application No. 61/822,637, filed on May 13, 2013.

(56) References Cited

U.S. PATENT DOCUMENTS

| | | | |
|---|---|---|---|
| 2011/0044533 A1* | 2/2011 | Cobb | G06F 16/907 |
| 2014/0324207 A1* | 10/2014 | Nagahara | G06Q 50/04 |
| | | | 700/100 |
| 2015/0039625 A1* | 2/2015 | Nisbet | G06F 9/542 |
| | | | 707/746 |

OTHER PUBLICATIONS

Lee, Kang B., et al. "A Sensor Model for Enhancement of Manufacturing Equipment Data Interoperability," vol. 3: Design, materials and Manufacturing, Parts A, B, and C, Nov. 9, 2012, p. 705.
Search Report for EP18158327.9, dated Mar. 16, 2018.

\* cited by examiner

METHOD AND SYSTEM FOR ORGANIZING AND STORING MANUFACTURING PROCESS INFORMATION

TECHNICAL FIELD

The present invention relates to capturing, organizing, storing, and analyzing manufacturing process information, and is of particular interest in relation to resource-constrained embedded devices.

BACKGROUND

In order to effectively improve manufacturing processes, it is important to gather information about those processes and to organize and store that information in ways that are useful to users, especially to enable users to analyze and interpret the information. There are a number of well-known methods of capturing, organizing, and storing manufacturing process information, several of which will now be discussed.

One method of capturing, organizing and storing information relevant to manufacturing processes is to have the Programmable Logic Controllers (PLCs) that control machines also capture information about those machines and associated processes. In many cases, the PLCs send that information via an Open Platform Communications (OPC, originally OLE for Process Control) server to be stored in a back-end database running on a server-class computer or in cloud storage. An example of such a computer is a PowerEdge™ T420 from Dell, Inc. containing a Xeon® E5-2430 processor from Intel Corporation (64-bit, 2.20 GHz, 6 cores), 64 gigabytes of RAM (volatile storage media), and a terabyte of non-volatile storage media (e.g., a hard drive).

Another, somewhat less common method of capturing, organizing and storing information relevant to manufacturing processes is to use an embedded device (i.e., a device that combines electronic hardware and software and possibly mechanical parts or other components, and which is typically designed to perform a dedicated function or task; e.g., vending machines, appliances, motor controllers, printers, etc.) to capture, organize, and store that information. A typical embedded device used for this purpose might contain a processor based on the ARM9™ architecture from ARM Limited (32-bit, 200 MHz, 1 core), 32 megabytes of RAM (volatile storage media), and 32 megabytes of non-volatile storage media (e.g., Flash memory).

Resource constraints are typical for embedded systems, especially memory constraints such as limited amounts of RAM and non-volatile memory (as described above), which make it infeasible for the embedded device to store all of the interesting information about a manufacturing process for a long period of time. Therefore, it is beneficial for the embedded device to organize and store captured information in as compact a way as possible in order to delay the need to discard information for as long as possible, while still enabling the information to be efficiently and effectively analyzed, aggregated, distributed, etc. Processor constraints (as described above) are also common.

One of the common methods used to work around memory limitations for both PLCs and for embedded devices that monitor manufacturing processes is to store information only for a short period of time. For example, PLCs usually store very little historical data; instead, it is common for the aforementioned server-class computer to routinely collect and store historical information. One disadvantage of this method is that it is highly dependent on the reliability of the network and other interconnected aspects of the system. For example, a prolonged network outage can result in loss of information. Another disadvantage of this method is the need for a computer to store the information in the long term (i.e., the system is not self-contained).

Another common method of working around memory limitations is to aggregate information at the time it is captured. For example, a resource-constrained embedded device may not be able to store all the information about every manufactured piece in a fast manufacturing process, but it may be able to capture and store aggregated information such as a total count of pieces manufactured over a particular span or interval of time. For example, it may capture the total count of pieces manufactured during a shift, while a particular part is being manufactured, while a particular production crew is working, etc. In a typical manufacturing environment, there may be many such spans of time (i.e., aspects of the process) that are of interest at the same time (e.g., Shift, Part, Production Crew, Hour, etc.).

A very simple method of storing aggregated information, known in the art, stores full information records for each span of time (i.e., aspect of the process) that is of interest. So, for example, a record might be stored for a particular shift and an additional record might be stored for each part that was run during that shift. One disadvantage of this method is it typically leads to a significant amount of duplicated and redundant information. Another disadvantage of this method is that it can be very difficult to correlate information across different aspects of the process that are measured (e.g., Shift, Part, Production Crew, Hour, etc.).

Another method of storing aggregated information, known in the art, assigns timestamps or other identifiers to data records and then relates those records using those identifiers. One disadvantage of this method is it tends to create many records. This increases the complexity of information organization and storage and adds overhead from the many links between records, which is of particular concern for resource-constrained embedded devices. Additional disadvantages occur when timestamps are used to relate records (which is quite common). Timestamps can be unreliable and difficult to work with in a number of ways.

One problem with timestamps is that clocks typically drift over time. While, in theory, this problem can be mitigated by automatically setting clocks with the Network Time Protocol (NTP), not all devices have access to an NTP server and those that do will still experience clock drift between updates and during periods of network instability. Of even more concern, human error in configuring time-related settings such as Time Zone and Daylight Saving Time can cause significantly incorrect timestamps to be recorded for a period of time (up until the point where error is discovered and corrected).

Changes to time, even to correct an existing error, can introduce significant issues. When time is set forward it can create unexpected gaps between records and inconsistencies in data within records. For example, if a clock is set forward by two minutes, a part that actually ran for 43 minutes may be recorded as running from 2:00 pm to 2:45 pm. Similarly, when time is set backward it can create unexpected overlap between records and inconsistencies in data within records. For example, if a clock is set backwards by one hour (e.g., due to correcting a Time Zone setting, or due to a Daylight Saving Time change if local time is being used) the same part that ran for 43 minutes may be recorded as running from 2:00 pm to 1:43 pm.

Issues can also arise from the degree of precision attached to timestamps (e.g., second, millisecond, or microsecond). If the timestamps are too coarse, events could appear to be simultaneous or connected when they should not; if timestamps are too fine, the opposite problem can occur: events that should be considered simultaneous or connected are recorded with different timestamps. Another potential point of confusion is "leap seconds", extra seconds occasionally inserted at unpredictable intervals in order to maintain consistency with the Earth's rotation that can introduce problems when calculating the difference between two times (e.g., the week of Jun. 24, 2012 actually contained 604,801 seconds rather than the 604,800 seconds in most weeks).

While these time-related issues have varying degrees of impact and can be mitigated in various ways, there are clear advantages to using time as just a piece of information and not to relate information records.

Users often need to aggregate, filter, transform, subdivide and otherwise operate on combinations of aspects of the process (e.g., Shift, Part, Production Crew, Hour, Batch, Lot, SKU, Work Order, Customer, Tool, etc.) in order to analyze and interpret manufacturing process information. For example, in a discrete manufacturing process, users might be interested in seeing down time for part 10-6456, but only when it was run during the first shift. This type of analysis is more difficult in systems that contain overlapping records, whether that overlap is caused by the system of organization and storage, by the use of timestamps to relate records, or by some other reason. This type of analysis is also more difficult, particularly for embedded devices, when there are many related records, which require more complex queries to retrieve information.

Another important consideration is the ability of users to modify captured manufacturing process information (e.g., if a correction is needed). This can be very difficult when there are multiple overlapping or related records that have to be modified in a coordinated fashion in order to ensure consistency of information across all records.

The present invention provides an improved method of organizing, storing, and analyzing captured manufacturing process information that overcomes these difficulties. Amongst other advantages: it allows for storing information for long periods of time; it reduces the amount of redundant information and thus reduces memory use as well as makes it easier to modify information; it stores information with clear, non-overlapping boundaries in a way that enables intuitive analysis and exploration; it reduces the number and complexity of relationships between records in a way that improves query performance; and it uses time simply as a piece of information instead of as a "key" that relates records. The features of the present invention can also be applied to the benefit of non-resource-constrained devices and to general-purpose computers.

SUMMARY

There is disclosed herein an improved method and system for capturing, organizing, storing, and analyzing manufacturing process information which avoids the disadvantages of prior methods and systems while affording additional structural and operating advantages.

Process information is organized into extensible Channels, each of which captures information stored as extensible Events. Each Event represents an interval of time or a point in time, and contains captured process information that is relevant to that interval or point of time. Events can be split into pieces called Event Fragments, each of which also contains process information that is relevant to its associated period of time.

Process information within Events can be organized into Fields of different types, such as Metrics (numeric values that measure something about the process), Category Values (structured information about what is being measured), Annotations (unstructured information explaining something that is measured) and System Fields (information typically of limited interest to users and primarily used to make the rest of the system work). Category Analysis refers to analyzing captured information from different perspectives, each of which is typically based on a combination of Channels, Categories, Metrics, and in some cases Annotations or other information.

Events and Event Fragments have Boundaries (points in time at which they begin or end). When Boundaries between Channels occur at substantially the same point in time (i.e., the Boundaries are shared), it can be easier to organize, store, interrelate, analyze, explore and otherwise manage and use process information, including using such process information for Category Analysis.

One way to create shared Boundaries is through relationships between Channels, referred to as Channel Boundary Relationships. Some Channel Boundary Relationships describe the fact that shared Boundaries exist, while other Channel Boundary Relationships force shared Boundaries to exist. Examples of Channel Boundary Relationships include Coupling, Fragmenting, Projecting, and Aggregating.

Coupling Relationships occur when each Event in one Channel naturally falls within the Boundaries (inclusive of those Boundaries) of one Event of some other Channel. Fragmenting Relationships occur when each Boundary of one Channel forces a shared Boundary to be created in some other Channel. Projecting Relationships occur when a group of Channels generate a new Channel (the Projecting Base Channel) that stores enough information to re-generate the group, including all of the group's Boundaries. Aggregating Relationships occur when one Channel shares Boundaries through Coupling or Fragmenting with another Channel and has its Events aggregated along the shared Boundaries or a subset thereof, with the results being captured in a new Channel.

Channel Boundary Relationships can create, or be combined to create, a set of Channels that share Boundaries in such a way that those Boundaries demarcate intervals of time that contain the associated information for that interval of time (referred to as Slicing). Combining Projecting and Fragmenting Relationships with Slicing can be very powerful for Category Analysis, especially when the Projecting Base Channel Boundaries are used to demarcate intervals of time.

Shared Boundaries can be created in a more general sense when a Boundary in one Event is created, modified, or eliminated, based on the creation, modification, or elimination of a Boundary in another Event, such that the Boundaries occur at substantially the same point in time.

Shared Boundaries also facilitate Exploration Hierarchies, which are a form of Category Analysis that enables users to view, analyze, interpret, understand, and otherwise benefit from Metrics while traversing a group of Categories. Exploration Hierarchies can be constructed from Channels, Categories and Metrics, where the Categories can be in any order and the Metrics are selected based on the Categories and associated Channels that have been traversed.

Exploration Hierarchies are particularly useful if the Channels in the hierarchy are ordered so that Channels lower in the hierarchy respect the Boundaries of Channels higher in the hierarchy. Channel Boundary Relationship information is helpful in determining, programmatically or otherwise, whether one Channel respects the Boundaries of another Channel.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
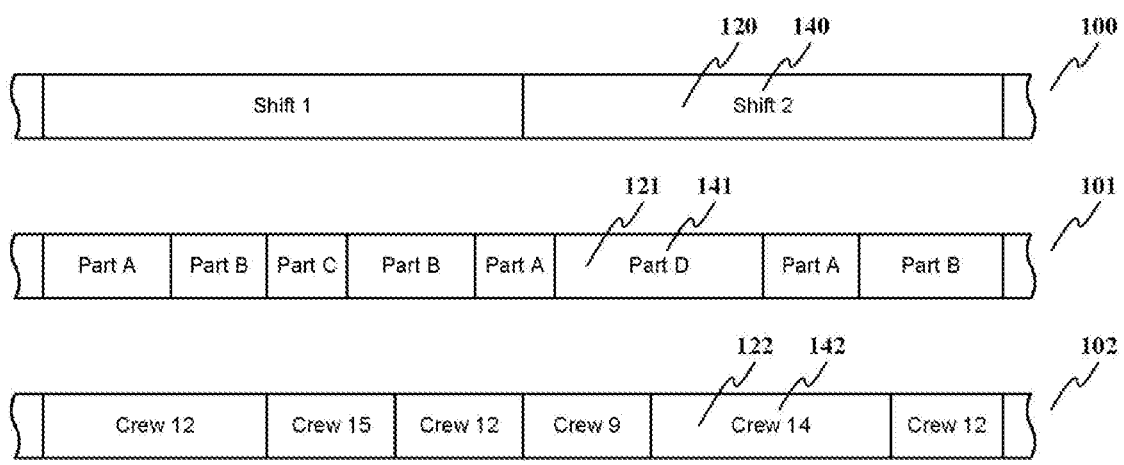
FIG. 1 is an example of the Shift, Part, and Crew Channels of a preferred embodiment. Time flows left to right in this and similar following diagrams.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Specifically, although resource-constrained embedded devices are described as part of some embodiments of the present invention, it is important to note that the present invention also provides benefits when applied to non-resource-constrained devices, general-purpose computers, or combinations of resource-constrained embedded devices, non-resource-constrained devices, and general-purpose computers. The present disclosure is not intended to limit the broad aspect of the invention to resource-constrained embedded devices.

Overview of the Process Data Model

The Process Data Model (PDM) organizes information into Channels (e.g., a Shift Channel 100, a Part Channel 101, and a Crew Channel 102, shown in FIG. 1). Each Channel captures information about a process; in a preferred embodiment, a manufacturing process. Any combination of Channels can be overlaid on a common timeline, providing many different ways of exploring and analyzing process information. Each Channel provides additional information that "decorates" the common timeline. A broad analogy can be drawn to television channels. Similarly to how each television channel features different shows, each PDM Channel features different information (i.e., information about a different aspect of the process).

Channel information is captured in Events (e.g., Shift Event 120, Part Event 121, and Crew Event 122), each of which describes an interval (span) of time or a point in time. Events that represent intervals of time can be referred to as "closed" when they have both a defined start and a defined end, or as "open" when their end has not yet been defined (Events that represent points in time have the same start and end and are always closed). If each Channel's Events have a commonly defined structure that is shared by all Events for a given Channel, it is easier to aggregate Events (e.g., combine them over a period of time, a set of processes, etc.). This does not preclude having differently structured Events in a given Channel.

In a preferred embodiment, the backbone of the Process Data Model is formed by two Channels: Production Metric Channel 203 (shown in FIG. 2) and Production State Channel 304 (shown in FIG. 3 and FIG. 6). These two Channels capture important information used for process monitoring, performance management, process improvement, etc.

In a preferred embodiment, Production Metric Channel 203 captures production metrics such as counts (e.g., total pieces), durations (e.g., run time), targets (e.g., target count), labor (e.g., labor hours), cycles (e.g., slow cycles), and others. Additional metrics may be derived from the information captured by this Channel (e.g., rates, variances, efficiencies, and overall equipment effectiveness).

In a preferred embodiment, Production State Channel 304 captures the state of the production asset as well as one or more associated reasons for that state, and other related information. It models production as a continuous sequence of performance-based states: Run, Unplanned Stop, Planned Stop, Not Scheduled, and Unknown. It will be apparent to one skilled in the art that this set of states may be modified or extended without departing from the spirit of the invention; for example, Run might be broken into Normal Run, Slow Run, and Fast Run.

Horizon and Granularity

When analyzing process information, high levels of granularity (i.e., detail) are typically most useful when looking at information from the recent past. This fine-grained information typically becomes less interesting and less valuable as time passes. For example, in a preferred embodiment, when reviewing production information in real-time or for the recent past (e.g., the last 24 hours), having the ability to view a timeline of sequential production states and production cycles is extremely valuable. On the other hand, when reviewing production information from several months back, it is typically more useful to look at aggregated information for longer spans of time (e.g., days, weeks, or months), such as a trend of total down time.

The diminishing importance of fine-grained information over time can be taken advantage of when designing a system for resource-constrained embedded devices. As mentioned earlier, with limited storage space it can eventually become necessary to discard some information in order to free up space—the point in time before which no information is available can be called a "time horizon." Establishing different time horizons for fine-grained and coarse-grained information can help maximize the time for which the most relevant information remains available.

As few as two time horizons can substantially optimize the storage of both short-term and long-term information. For example, a time horizon of 4 weeks with a nominal granularity of five minutes would result in 8,064 records, and a time horizon of 52 weeks with a granularity of one hour would result in 8,736 records, for a total of 16,800 records. This is more manageable for a resource-constrained embedded device than the 104,832 records that would result from keeping 52 weeks of information with five-minute granularity, and it is more useful than the 672 records that would result from keeping four weeks of data with one-hour granularity.

This concept is naturally extensible to three or more time horizons, though it can be beneficial to keep the number of time horizons small in order to simplify the user interface and mental model of the system. Groups of Channels that have the same nominal granularity and nominal time horizon can be referred to as "Time Horizon Groups."

It is possible to allocate or configure a specific amount of memory for each Time Horizon Group. This would allow, for example, estimating a projected time horizon for each group based on a specific amount of memory and existing Events in the group's Channels.

Events

An Event is an entity that represents an interval (span) of time or a point in time, and which contains captured process information that is relevant to that interval or point of time. Events can be split into pieces called Event Fragments. Event Fragments are similar to Events in that they contain captured process information that is relevant to their associated period of time. An alternative way to think of Events and Event Fragments is for every Event to consist of one or more Event Fragments, thus introducing the concept of an Event that consists of a single Event Fragment.

An Event Boundary is a point in time at which an Event begins or ends. Events that are a point in time have only one Boundary, and such Events both begin and end on that Boundary.

Another kind of Boundary is the Fragment Boundary. Each Event Fragment has either one Fragment Boundary and one Event Boundary (if it is the first or last Event Fragment of an Event) or two Fragment Boundaries (if it is not the first or last Event Fragment of an Event). In the alternative way of thinking where every Event consists of one or more Event Fragments, an Event Fragment can have two Event Boundaries. Collectively, Event Boundaries and Fragment Boundaries can be referred to simply as Boundaries.

It can be useful to assign each Event a unique identifier (an Event ID), such as a universally unique identifier (UUID), which, among other uses, can be used as a database key. This helps ensure that references to Events are unambiguous (e.g., identifying Events by the times when they occur may be ambiguous because multiple Events may occur at the same time) and having a unique identifier makes it easier to relate any Event to any other Event.

Fields

Events capture information. Individual pieces of information captured in an Event can be referred to as Fields. Some examples of different kinds of Fields are Metrics, Category Values, Annotations, and System Fields.

Metrics are numeric values that measure something about the process being monitored. In a preferred embodiment, examples of Metrics include the number of pieces produced or the amount of time spent producing a given set of pieces.

Category Values are information about what is being measured. In a preferred embodiment, examples of Category Values include which shift manufactured a given set of pieces, or what part was being manufactured during a given interval of time. A related group of Category Values can be referred to as a Category. For example, in a preferred embodiment, "84-98423" and "12-89734" might be Category Values, and their Category might be "Part". One way of thinking about the relationship between Categories and Category Values is that Categories are questions and Category Values are answers. For example "Shift" is an example of a Category ("What shift was working at this time?"), while "First Shift" and "Second Shift" are examples of Category Values ("It was the First Shift").

Annotations are typically unstructured information explaining something that is measured. In a preferred embodiment, Annotations are free-form or ad hoc text such as "This was the day of our monthly equipment inspection and there were numerous unplanned stops as a result of that inspection."

System Fields are information that an embodiment uses to make the rest of the system work (these Fields are typically of limited interest to users).

One benefit of having different kinds of Fields in this way is that they can indicate aspects of Field behavior. This helps make it possible to use Fields programmatically when organizing, analyzing, visualizing, and otherwise using the associated information. For example, users may interact with Metrics in one way, Category Values in another way, Annotations in a third way, and may not interact with System Fields at all. In a preferred embodiment, Metrics may be visualized as informational columns in a table (e.g., as Production Counts, Production Rates, Labor Times, Production Targets, Planning Numbers, Cycles, Production Times, Overall Equipment Effectiveness, Total Effective Equipment Performance, or Six Big Losses) or as the height (y-axis) of a graph; Category Values may be visualized as rows in a table or as discrete elements (x-axis) of a graph (e.g., Shift 1, Shift 2, and Shift 3); and Annotations may be visualized as notes on a timeline such as when the x-axis of a graph is time, among other possibilities.

The kinds of Fields described in the preceding list are intended to be exemplary and should not be taken as exhaustive. It will be apparent to one skilled in the art that additional kinds of Fields are possible without departing from the spirit and scope of this invention.

Derived Information

Some information does not need to be stored in Fields, but can be derived (referred to as Derived Information) by applying information that comes from outside the Channel and Event system (referred to as External Information) to information that is stored within the Channel and Event system (referred to as Base Information). For example, Base Metrics and Base Category Values are two kinds of Base Information and Derived Metrics and Derived Category Values are two kinds of Derived Information. Derived Category Values are typically associated with one or more Derived Categories. External Information can come from user configuration, external databases, hard-coded or fixed values, or any number of other sources.

Metrics

As mentioned above, Metrics are numeric values that measure something about the process being monitored. Base Metrics are typically measured directly (manually or automatically). One way to create a Derived Metric is to apply a formula to one or more Base Metrics. For example, in a preferred embodiment, applying the formula "Average Rate=Total Count/Production Time" results in the creation of a Derived Metric called Average Rate. Some Metrics may only be of interest in the present moment, such as, in a preferred embodiment, the Current Rate (the rate at which pieces are currently being produced). These can be referred to as Ephemeral Metrics.

Category Values

As mentioned above, Category Values are information about what is being measured. Analyzing information using one or more Category Values can provide new perspectives and reveal important differences between the information measured for different Category Values within the same Category. For example, in a preferred embodiment, comparing the first shift performing a manufacturing process with the second shift may provide insights that help improve the performance of one or both shifts (e.g., machines suffer more unexpected stops during the first shift because they haven't "warmed up" yet).

One way to generate a Derived Category and its associated Derived Category Values is to do an external database lookup and relate a Base Category Value to a piece of External Information. For example, in a preferred embodiment, a Base Category Value could contain a set of GPS coordinates representing the location of a production line, which is looked up in a GPS database (External Information), resulting in Derived Categories called City and State, with City Derived Category Values such as Indianapolis and Springfield and State Derived Category Values such as Indiana and Missouri.

Category Value Hierarchies

Another way to create a Derived Category Value is by using a Category Value Hierarchy, which is a tree that defines the relationships between a set of Base Category Values (leaf nodes on the tree) and a set of Derived Category Values (branch nodes on the tree). Each level of hierarchy forms a new Derived Category.

Each Category Value may be contained in any number of Category Value Hierarchies, and a Derived Category may appear in any number of Category Value Hierarchies. Moreover, a Category Value may appear any number of times in a given Category Value Hierarchy.

Figure 4:
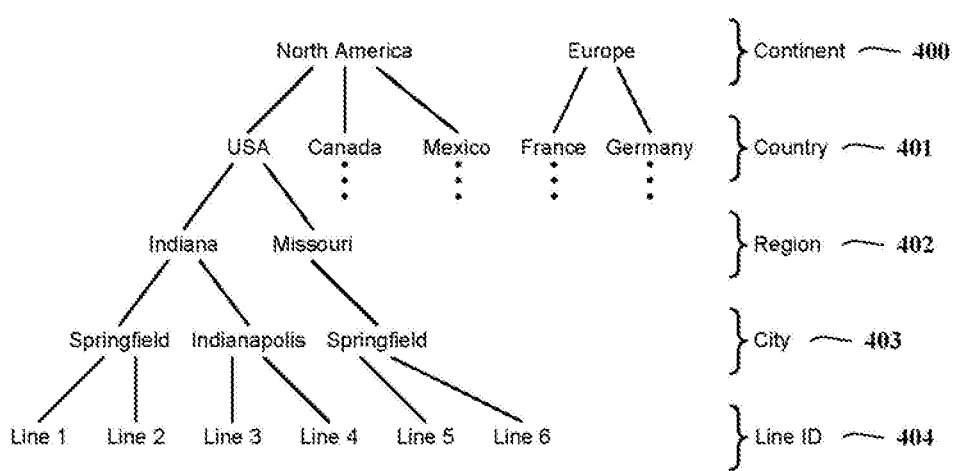
FIG. 4 shows an example of a Category Value Hierarchy containing several Derived Categories based on a Line ID.

FIG. 4 shows an example of a Category Value Hierarchy, with Base Category "Line ID" 404 and Derived Categories "City" 403, "Region" 402, "Country" 401, and "Continent" 400.

Category Analysis

Category Analysis refers to analyzing captured information from different perspectives, each of which is typically based on a different combination of Channels, Categories, Metrics, and in some cases Annotations and other information. Category Analysis may involve filtering, aggregating, grouping, and otherwise operating on those Channels, Categories, Metrics, Annotations, and other information. For example, in a preferred embodiment, a user might want to see down time information (Production State Category) from the perspective of First Shift (Shift Category); or a user might want to see changeover information (Production State Category) from the perspective of all but one Part (Part Category).

Channel Boundary Relationships

In order to support flexible Category Analysis, it is helpful to create Channels in such a way that the number of Boundaries shared between Channels is maximized. One way this is achieved is through Channel Boundary Relationships. Some Channel Boundary Relationships describe the fact that shared Boundaries exist, while other Channel Boundary Relationships force shared Boundaries to exist.

Some Boundaries can be described as "Natural", which means that the Boundary is intrinsic and meaningful to the Event itself—often because it is aligned to a change of a Category Value within the Channel. Other Boundaries can be described as "Synthetic," which means that the Boundary is driven by something external to the Event.

Shared Boundaries can be created in a general sense when a Boundary in one Event is created, modified, or eliminated, based on the creation, modification, or elimination of a Boundary in another Event, such that the Boundaries occur at substantially the same point in time.

Examples of Channel Boundary Relationships are Coupling, Fragmenting, Projecting, and Aggregating. It will be apparent to one skilled in the art that the associated concepts can be readily extended to describe other types of Channel Boundary Relationships.

Coupling Relationship

Figure 5:
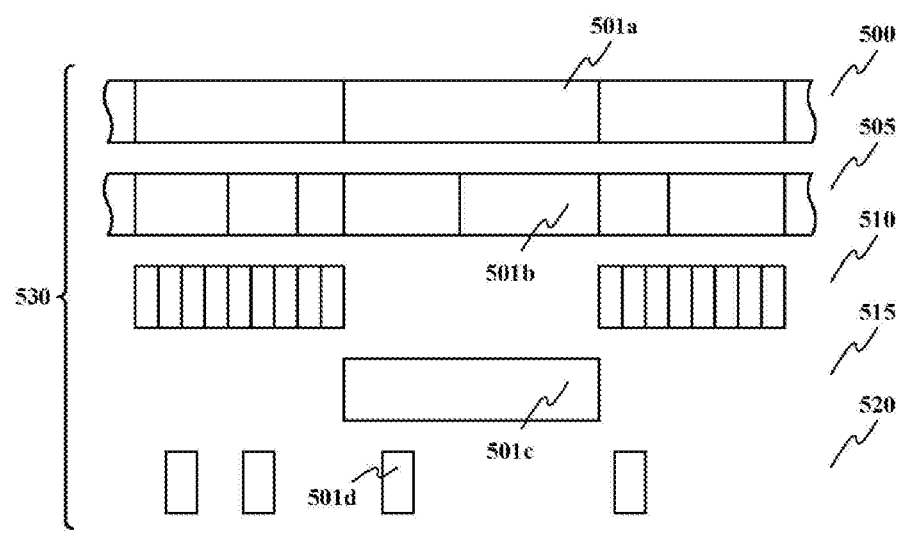
FIG. 5 shows an example of a Coupling Set. Counting from the top, the first Channel is a Coupling Parent for all four other Channels, and the second Channel is a Coupling Parent for the third and fifth Channels.

FIG. 5 shows examples of Coupling Relationships. Coupling occurs when each Event in one Channel (the Child; e.g., 505, 510, 515, and 520) naturally falls within the Event Boundaries (inclusive of those Boundaries) of exactly one Event of some other Channel (the Parent 500). Coupling Child Events 501*b*, 501*c*, and 501*d* have Natural Event Boundaries that fall within the Event Boundaries of their Coupling Parent Event 501*a*.

Coupling is a transitive relationship: if Channel A is a Coupling Parent of Channel B and Channel B is a Coupling Parent of Channel C, then Channel A is by definition a Coupling Parent of Channel C.

A single Coupling Parent Channel and its one or more Coupling Child Channels can be referred to as a Coupling Set 530. A Channel may be a member of any number of Coupling Sets (as either Parent or Child).

Figure 6:
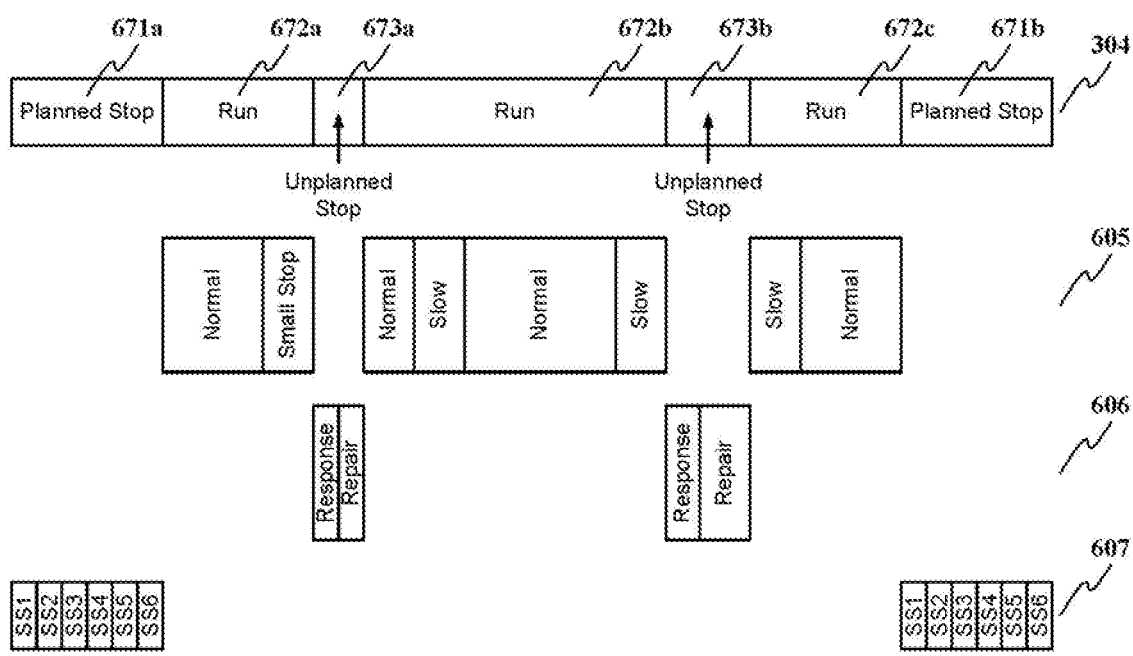
FIG. 6 shows a Coupling Set from a preferred embodiment consisting of the Production State Channel, the Performance Zone Channel, the Response Time Channel, and the SMED Step Channel.

FIG. 6 shows the Production State Channel 304, which, in a preferred embodiment, often takes the role of Coupling Parent Channel. It can have numerous Coupling Children Channels; for example:

The Performance Zone Channel 605, which models each Run Event 672 (e.g., 672a, 672b, and 672c) from the Production State Channel as a sequence of performance zones, e.g., Normal, Slow, and Small Stop;

The Response Time Channel 606, which models each Unplanned Stop Event 673 (e.g., 673a and 673b) as a Response Time Event and a Repair Time Event;

The SMED Step Channel 607, which models each Planned Stop Event 671 that is a changeover (e.g., 671a and 671b) as a series of steps that can be individually tracked for improvement;

The Cycle Channel (not shown), which models production as a series of individual cycles (for slower operations) or batches of cycles (for faster operations; some operations could have hundreds of cycles occurring each second). The Cycle Channel enables an extremely detailed view of production cycles and their associated information. In resource-constrained embedded devices, it is possible for the Cycle Channel to be highly compressed: each Event may contain encoded information about multiple cycles.

Conditional Coupling

While it can be useful for the Events in a Channel to share a common structure, some Events may have additional information beyond that common structure. One way of handling this is to create a separate Channel to contain the additional information, where each Event in the new Channel is associated with a specific Event in the original Channel. This new Channel is naturally a Coupling Child of the original Channel. In a preferred embodiment, Performance Zone Channel 605, Response Time Channel 606, and SMED Step Channel 607 all contain additional information for specific Events in Production State Channel 304.

The Events in the new Channel may correspond to a specific kind of Event in the original Channel. When this happens, the Coupling Relationship between the two Channels can be described as a Conditional Coupling Relationship.

Some Conditional Coupling Relationships can occur when the Coupling Parent Channel has a specific Category Value or set of Category Values. This can be called Category Based Conditional Coupling. For example, in a preferred embodiment, Performance Zone Channel 605, Response Time Channel 606, and SMED Step Channel 607 correspond to Events with the "Run", "Unplanned Stop", and "Planned Stop" values of the Production State Category respectively. In another embodiment, whenever the Production State Category in the Production State Channel has any Category Value besides "Not Scheduled", Events are created on that embodiment's Production State Details Channel, which is a Coupling Child of the Production State Channel. Category Based Conditional Coupling may be based on one or more Categories.

Other Conditional Coupling Relationships can occur when a Metric in the Coupling Parent Channel is within a certain range. This can be called Metric Based Conditional Coupling. For example, in one embodiment, when Performance (a Derived Metric based on cycle information) drops below 50%, additional cycle information may be gathered into the Poor Performance Channel, a Coupling Child of the Performance Zone Channel.

It will be apparent to one skilled in the art that different kinds of Conditional Coupling Relationships may be created without departing from the spirit of the invention.

Fragmenting Relationship

Figure 7:
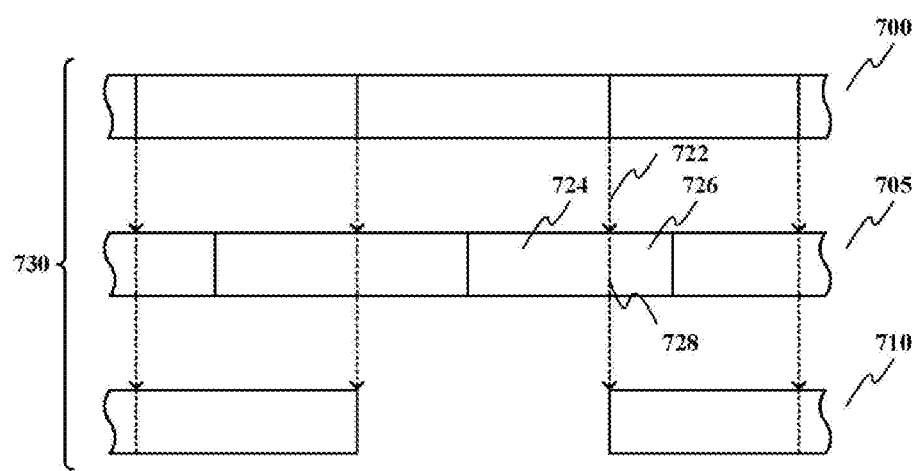
FIG. 7 shows an example of a Fragmenting Set, wherein the Channel at the top is a Fragmenting Parent for the other two Channels.

Two Channels may not naturally have a Coupling Relationship, but it may still be desirable to perform Category Analysis with them. FIG. 7 shows examples of Fragmenting Relationships. With a Fragmenting Relationship, each Boundary of one of the Channels (the Parent 700) forces a behavior in the other Channel (the Child; e.g., 705 or 710). Whenever a new Boundary occurs in the Fragmenting Parent Channel, any Fragmenting Child Channel with an Open Event will either close that Event (creating a Natural Boundary) or split that Event (shown by 722) into Event Fragments (e.g., 724 and 726) by creating Synthetic Boundary 728 such that the Fragmenting Child Channel shares the Fragmenting Parent Channel Boundary 722.

A single Fragmenting Parent Channel and its one or more related Fragmenting Child Channels can be referred to as a Fragmenting Set 730. A Channel may be a member of any number of Fragmenting Sets (as either Parent or Child).

Figure 3:
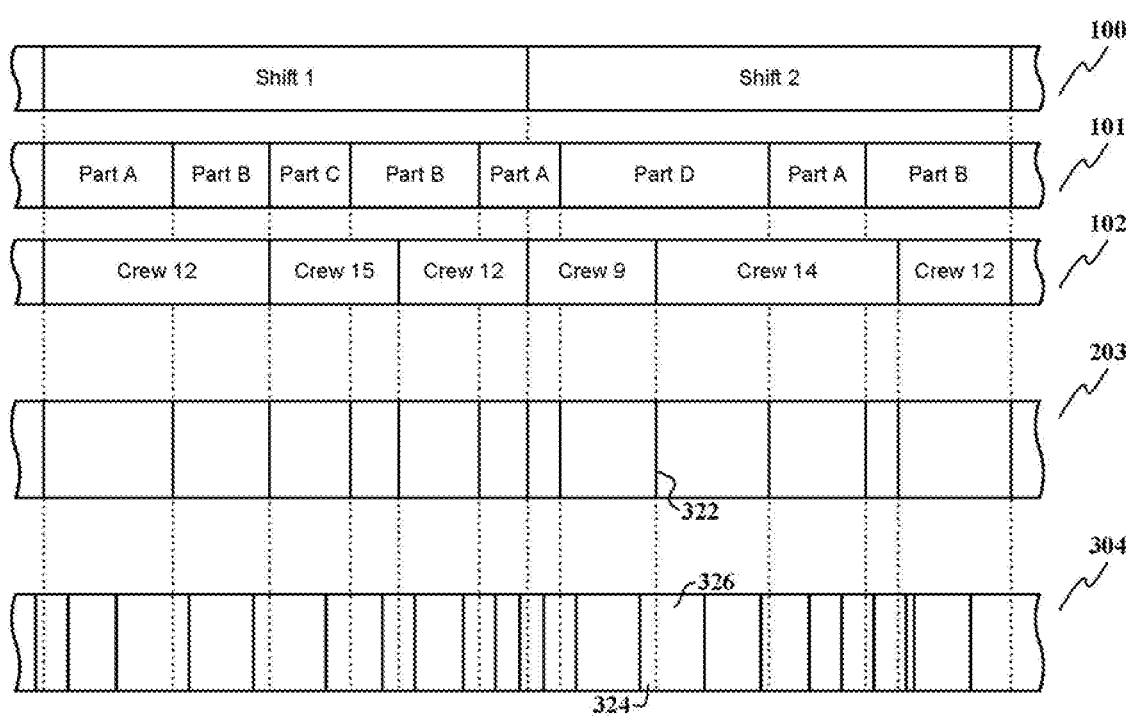
FIG. 3 is an expanded version of FIG. 2 that additionally shows the Fragmenting Relationship between the Production Metric Channel (Fragmenting Parent) and the Production State Channel (Fragmenting Child).

For example, in a preferred embodiment, shown in FIG. 3, the Production Metric Channel 203 and Production State Channel 304 are in a Fragmenting Relationship, with the Production Metric Channel being the Fragmenting Parent Channel. As an example of fragmenting, Production Metric Channel Boundary 322 creates Production State Channel Event Fragments 324 and 326. This allows analysis of, e.g., the amount of down time with the primary reason "No Operator", broken down by Shift (or Part, Production Crew, Hour, etc.).

Projecting Relationship

One method of ensuring a group of Channels share the same set of Boundaries is for all of those Channels to be in Fragmenting Relationships with each other (so that each Channel is a Fragmenting Parent to each other Channel). However, there is another method that is typically more efficient in processing time and storage space, as well as providing other benefits.

Figure 8:
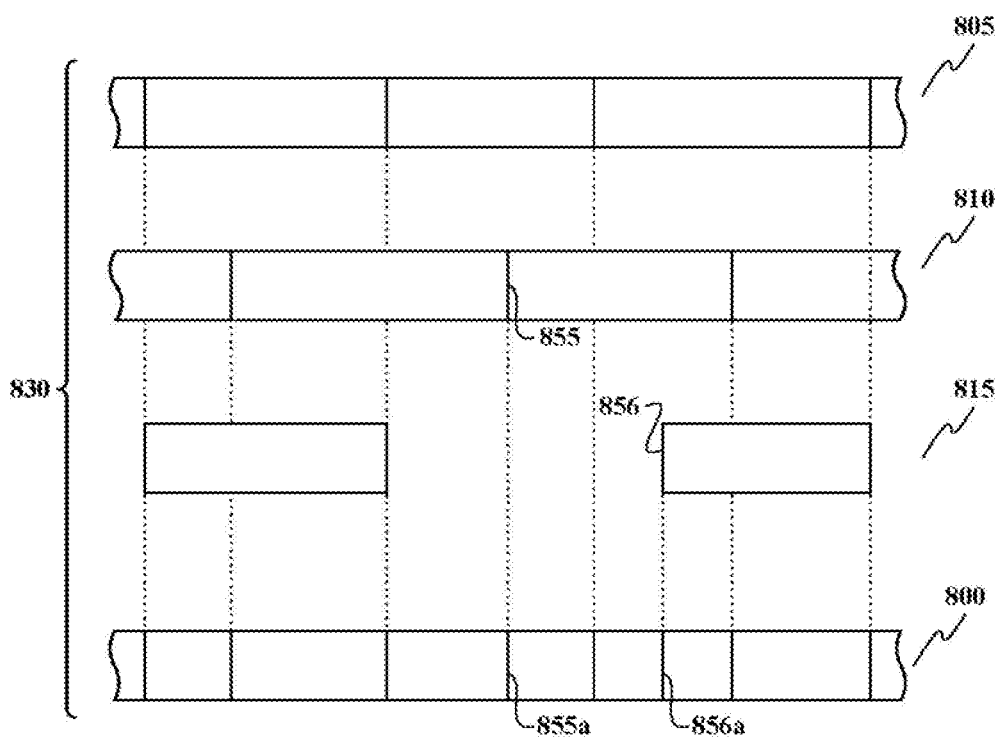
FIG. 8 shows an example of a Projection Set, wherein the three Projecting Source Channels at the top generate and are projected from the Projecting Base Channel at the bottom.

As shown in FIG. 8, it is possible to accomplish the same goal with a group of Channels (Source Channels, e.g., 805, 810, 815) by generating a new Channel (the Base Channel 800) that stores enough information to re-generate the Source Channels. Each Base Channel Event typically includes the union of the Fields contained in all of the Source Channel Events that contribute to it, and each Source Channel Boundary (whether it be an Event Boundary or a Fragment Boundary) has a corresponding Base Channel Event Boundary.

One way to create a Base Channel is to create a new Base Channel Event any time a Source Channel Category Value Field changes (as long as the Source Channel that contributed that Category Value Field also creates a new Event when that Category Value Field changes). For example, in FIG. 8, when a Category Value changes in Source Channel 810, Event Boundary 855 is created, but that Category Value change is actually recorded in Base Channel 800, creating Synthetic Event Boundary 855a. Later, when a Category Value changes in Source Channel 815, Event Boundary 856 is created, but it too is actually recorded in Base Channel 800, creating Synthetic Event Boundary 856a.

A single Projecting Base Channel and its two or more related Projecting Source Channels can be referred to as a Projection Set (e.g., 830). A Channel can act as a Projecting Source Channel in any number of Projection Sets, but a Projecting Base Channel can only act as the Base Channel in a single Projection Set. (If it were the Base Channel for any other Source Channel, that Channel would be part of its Projection Set, because by definition the Base Channel is created from all of the Source Channels in its Projection Set.)

One way to provide Event IDs for each of the Events in the Projecting Source Channels, is for each Projecting Base Event to include a System Field for each of the Projecting Source Channels to hold the corresponding Source Event ID.

It is not necessary to store information for the Projecting Source Channels other than the Projecting Base Channel itself; Projecting Source Channels can be recreated ("projected") from the Projecting Base Channel. One method of projection is through relational algebraic projection of aggregations of the Fields that were contributed by the Projecting Source Channel, grouped by the Event ID of the Projecting Source Channel.

For example, in a preferred embodiment, where the Shift Channel is a Projecting Source Channel and the Production Metric Channel is the associated Projecting Base Channel, if the Shift Channel has only the Metrics "total_count" and "run_time", the Category "shift_id", and the System Field "shift_event_id", and if the storage mechanism is a SQL database, the following query will project the Shift Channel from the Production Metric Channel:

```
SELECT SUM(total_count), SUM(run_time), shift_id, shift_event_id
AS event_id FROM production_metric_channel GROUP BY
shift_event_id
```

If the sets of Fields in each Source Channel are sufficiently similar, the storage requirements of such a group of Channels are likely to be significantly reduced, possibly by an order of magnitude or more. This is especially beneficial for embodiments of the system in resource-constrained embedded devices.

Figure 2:
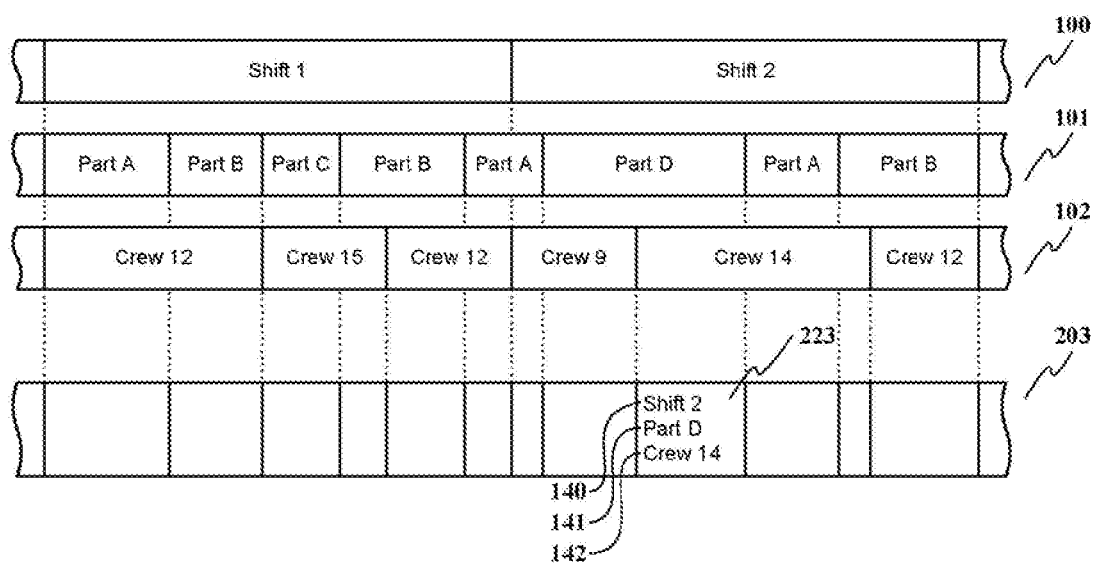
FIG. 2 is a diagram that shows the generation of the Production Metric Channel (a Projecting Base Channel) from the Shift, Part, and Crew Channels (Projecting Source Channels) in a preferred embodiment. Many more Source Channels could be added; they are not shown here due to space constraints.

In a preferred embodiment shown in FIG. 2, the Production Metric Channel 203 is a Projecting Base Channel, and some of its Projecting Source Channels are Shift 100, Part 101, and Crew 102. Category Value Fields that are stored from Source Channels into Base Channel Event 223 are Shift Category Value 140 "Shift 2", Part Category Value 141 "Part D", and Crew Category Value 142 "Crew 14". The Projection Set may have an arbitrary number of additional Source Channels (e.g., Hour, Batch, Lot, SKU, Work Order, Customer, and Tool).

Combining Projecting and Fragmenting

By definition, Coupling Child Channels have Event Boundaries that fall within the Event Boundaries of their Coupling Parent Channel. If a Coupling Parent Channel is also a Projecting Source Channel, it expands the scope and range of Category Analysis if the Events of its Coupling Child Channel fall within the Event Boundaries of the associated Projecting Base Channel. This does not occur naturally unless that Coupling Child Channel is also a Coupling Child of every other Projecting Source Channel in the Projecting Set. However, shared Boundaries can also be created by making the Coupling Child a Fragmenting Child of the Projecting Base Channel. Doing so ensures that the Coupling/Fragmenting Child's Event Fragments fall within the Boundaries of the original Coupling Parent, the Projecting Base Channel, and all other Projecting Source Channel Events in the set. While the example above is motivated by a Coupling Child Channel, a Channel that was initially unrelated to any Channel in the Projecting Set can be used in the same way (i.e., made a Fragmenting Child of the Projecting Base Channel). Combining Projecting and Fragmenting Relationships in this manner can be very powerful for Category Analysis, especially when the Projecting Base Channel is a Slice Parent Channel as described later in this disclosure.

Aggregating Relationship

Figure 9:
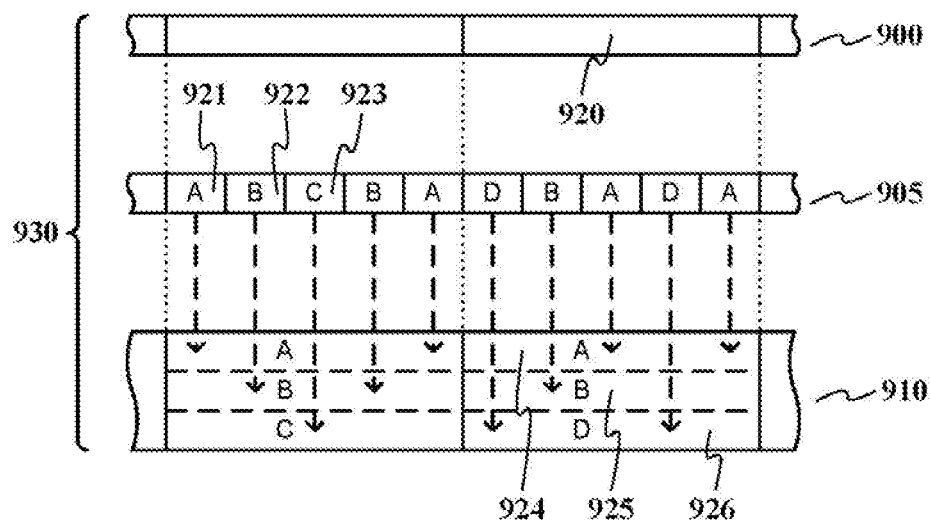
FIG. 9 shows an example of an Aggregation Set. Counting from the top, the first Channel is an Aggregating Boundary Parent, the second Channel is an Aggregating Data Parent, and the third Channel is the Aggregating Child.

In an Aggregating Relationship, as shown in FIG. 9, a Channel 905 (the Data Parent) that is a Coupling or Fragmenting Child of (i.e., shares Boundaries with) another Channel 900 (the Boundary Parent) has its Events (921, 922, 923, etc.) aggregated along the Boundaries (or some subset of the Boundaries) of the Boundary Parent Channel, with the results being captured in a new Channel 910 (the Child). The difference in appearance in FIG. 9 between Child Channel 910 and other Channels is explained below in the section entitled "Aggregating Relationships and Category Values."

Boundaries of Aggregated Events (e.g., Events in Child Channel 910) should not be construed as being the same as the Boundaries of the Data Parent Events (e.g., Events in Data Parent Channel 905) from which they were aggregated. Although they represent a period of time within which all of the Events that were aggregated occurred, they should not be used to perform Category Analysis as if they were the actual Boundaries of the underlying information. For example, Event 925 is an Aggregated Event for Category Value "B", but as clearly can be seen, neither of its Boundaries are shared with "B" in Data Parent Channel 905.

These three Channels (Boundary Parent 900, Data Parent 905, and Child 910) can be collectively referred to as an Aggregation Set (e.g., 930). An Aggregating Child Channel can only act as the Aggregating Child Channel in a single Aggregation Set, but any Channel can act as an Aggregating Boundary Parent Channel or Aggregating Data Parent Channel in any number of Aggregation Sets.

Figure 10:
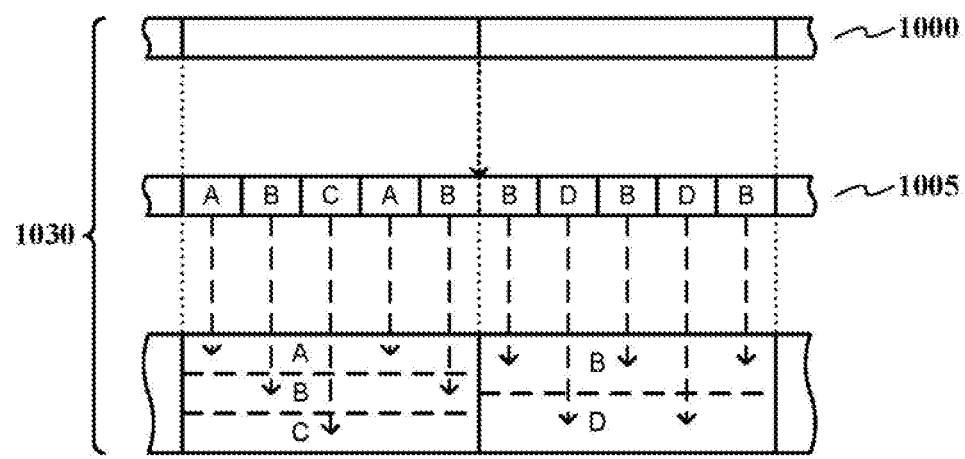
FIG. 10 shows an example of an Aggregation Set similar to that in FIG. 9, but with the Aggregating Relationship enabled by Fragmenting instead of Coupling.

FIG. 10 shows a different Aggregation Set 1030; the primary difference from Aggregation Set 930 is that Aggregating Boundary Parent Channel 1000 has a Fragmenting Relationship with Aggregating Data Parent Channel 1005 instead of a Coupling Relationship.

Aggregating Relationships can be used to move information from one Time Horizon Group to another Time Horizon Group that has a longer time horizon, with that information being combined, aggregated, compressed, or otherwise transformed as needed to preserve the desired aspects of the information within a memory size suitable for the longer time horizon. This can be especially useful as a way of managing the limited amount of memory available in resource-constrained embedded devices.

Aggregating Relationships and Metrics

In a preferred embodiment, Base Metrics that support straightforward aggregation are strongly favored. One way to help ensure straightforward aggregation is to select Base Metrics that have aggregation functions that are both commutative and associative. For example, summation is both commutative and associative, and can be used in a straightforward way to aggregate most counts and durations (Metrics that are aggregated by summation may be called "Accumulating Metrics"). Other examples of aggregation functions that are both commutative and associative include selecting the maximum or minimum value from a set of values. This does not preclude the use of aggregation functions that are not commutative or associative.

Metrics often have relationships that provide a choice as to which Metric is treated as a Base Metric and which is treated as a Derived Metric. For example, an embodiment might track both "Target Time per Piece" and "Target Count" (which are related through the equation Target Count=Duration/Target Time per Piece). Aggregation is significantly simpler if "Target Count" is chosen as the Base Metric, because as a count it can be aggregated through summation (i.e., it is an Accumulating Metric), whereas aggregating Target Time per Piece to get the expected Target Count value involves a weighted average. As another example, "Labor Hours" is preferred to "Number of Operators" as a Base Metric for similar reasons.

Aggregating Relationships and Category Values

Category Values can complicate the aggregation process because they often represent important distinctions that can be very relevant when analyzing information—distinctions that would be lost if Events with different Category Values were aggregated together, since it would be impossible to tell which parts of the Aggregated Event went with which Category Values.

Figure 11:
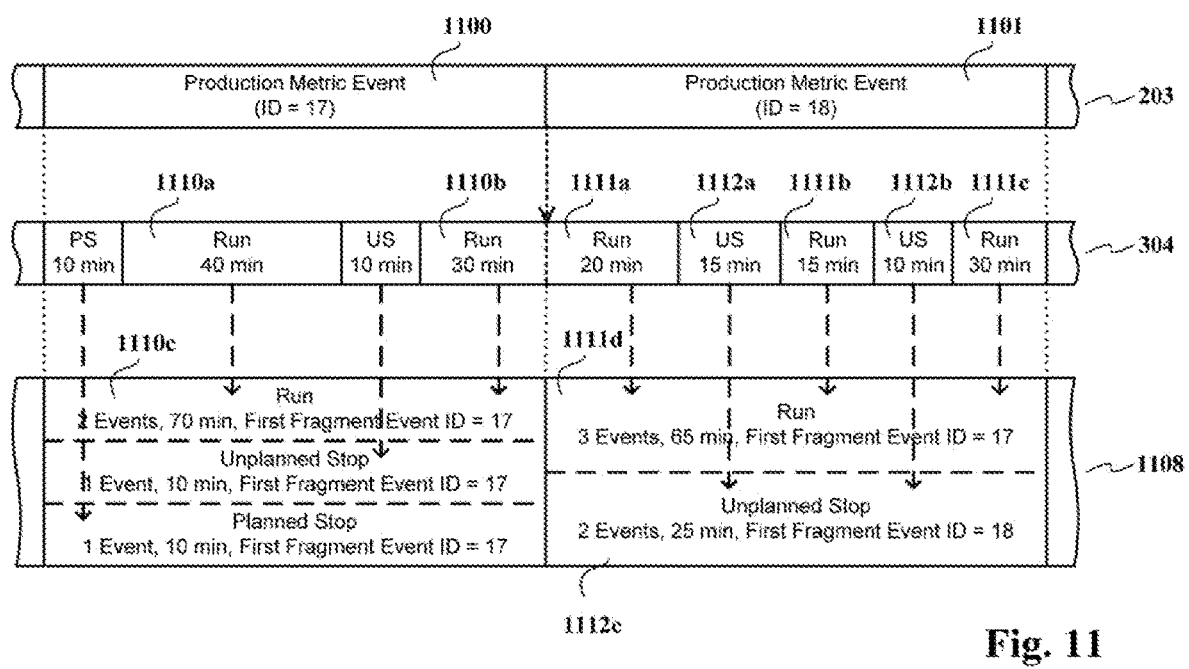
FIG. 11 shows an Aggregation Set from a preferred embodiment consisting of the Production Metric Channel (Aggregating Boundary Parent), the Production State Channel (Aggregating Data Parent), and the Aggregated Production State Channel (Aggregating Child).

One preferred way (as shown in FIG. 9) to preserve these distinctions is to create one Aggregated Event (924, 925, and 926) for each Category Value used for that Field during the Boundary Parent Event 920. An example from a preferred embodiment is shown in FIG. 11. In the context of Production Metric Event 1100 there are Aggregated Events for "Run", "Unplanned Stop", and "Planned Stop" in Aggregated Production State Channel 1108, combining Production State Events with each of those Category Values from Production State Channel 304, but not for the Production State "Not Scheduled" because no Production State Events with that Category Value occurred during Production Metric Event 1100. In some embodiments, Aggregated Events may be created as closed Events when the Boundary Parent Event is closed; in others, Aggregated Events may be created as open Events as needed for the Events that they aggregate, to be closed when the Boundary Parent Event is closed.

Note that Aggregated Events may have a somewhat different set of Fields than the original Events from which they were generated. For example, a preferred embodiment includes a count of the number of Events that were aggregated (referred to as Event Occurrences). Additionally, not every Aggregating Data Parent Field needs to be maintained in the Aggregated Events. Some System Fields (e.g., fields identifying specific Events) may entirely lose their meaning during aggregation; some Metrics may not be useful after aggregation (e.g., Event start and end times); some Category Values may not be of enough importance to keep; etc. For example, in one embodiment, Production State Events also includes a Secondary Reason Field that might not be considered relevant for the longer time horizon of the Aggregated Events and could be dropped during aggregation.

One way to extend aggregation to Events with multiple Category Value Fields is to only aggregate Events that share the same combination of Category Values. For example, in some embodiments, the Production State Channel may also have a "Primary Reason" Category Value Field. In this case, there would be a separate Aggregated Event for each combination of Category Values that occurred during that Production Metric Event (e.g., Aggregated Events for "Run+ Normal Operation", "Run+Understaffed", "Unplanned Stop+Infeed Failure", and "Unplanned Stop+Out of Materials"). Since the number of Aggregated Events associated with each Boundary Parent Event, and hence the amount of storage space required, tends to grow geometrically with the number of Category Value Fields, when using this method it is advisable to keep the number of Category Value Fields small.

Aggregating Event Fragments

One benefit of creating Aggregated Channels is that they can require significantly less storage than the Aggregating Data Parent Channel from which they are created. This means that Aggregated Channels can have a longer time horizon before they discard information. For example, in a preferred embodiment, the Production State Channel (the Data Parent) is in an Aggregating Relationship with the Production Metric Channel (the Boundary Parent), creating an Aggregated Production State Channel (the Child). If there are many more Events in the Production State Channel than in the Production Metric Channel, the Aggregated Production State Channel can have a substantially longer time horizon than the Production State Channel with a lower cost in storage space.

However, users will typically want to view Production State information aggregated not by Production Metric Events (Projecting Base Channel), but by an associated Projecting Source Channel such as Shift or Part (e.g., "Over the past week, how much time did First Shift lose to Unplanned Stops?"). In other words, displaying Aggregated Production State Events may involve additional aggregations.

One complication that might arise during subsequent aggregations has to do with the count of Data Parent Events captured in the Aggregated Events (referred to earlier as Event Occurrences). If Event Fragments are included in Event Occurrences, simply summing Event Occurrences during the second aggregation may give an incorrect result, since each Event Fragment will be counted as if it were a complete Event. One skilled in the art will recognize that other Fields may present similar problems.

One way of resolving this complication is to include additional information in Aggregated Events that makes it possible to correct for double-counting of Event Fragments. For example, a Field could be included in each Aggregated Event that captures the Event ID of the Boundary Parent Event in which the first Event or Event Fragment of a given Aggregated Event began. This information can be used to obtain a count of duplicated Event Fragments that occur in any subset of Aggregated Events, and this duplicate count can then be subtracted from the sum of Event Occurrences in order to obtain the correct number of unique Events contained in the set of Aggregated Events. The following algorithm provides an example of how an accurate count could be obtained, taking into account the possibility that aggregations may be performed on a filtered group of Events. Note that this algorithm assumes the set of Aggregated Events is sorted earliest to latest.

```
Occurrences = 0
Previous_Aggregated_Event = null
for each Aggregated_Event in set of Aggregated Events
    Occurrences = Occurrences + Aggregated_Event.Event_Occurrences
    if Previous_Aggregated_Event is not null AND
        (Aggregated_Event.First_Fragment_Event_ID equals
            Previous_Aggregated_Event.First_Fragment_Event_ID
        OR Aggregated_Event.First_Fragment_Event_ID equals
            Previous_Aggregated_Event.Boundary_Parent_Event_ID)
```

```
then decrement Occurrences
Previous_Aggregated_Event = Aggregated_Event
```

FIG. 11 shows an example of an Aggregation Set from a preferred embodiment, in which Production State Channel 304 (the Data Parent) has its Events aggregated along the Boundaries of Production Metric Channel 203 (the Boundary Parent), creating the Aggregated Production State Channel 1108 (the Child). For example, Run Event 1110a and Run Event Fragment 1110b occurred during Production Metric Event 1100 and are aggregated to form Aggregated Run Event 1110c. Similarly, Run Event Fragment 1111a and Run Events 1111b and 1111c occurred during Production Metric Event 1101 and are aggregated to form Aggregated Run Event 1111d.

Because Run Event Fragments 1110b and 1111a are part of the same Run Event, Aggregated Run Event 1111d has its First Fragment Event ID field set to 17, the ID of Production Metric Event 1100, which is the Production Metric Event during which the Run Event actually began. On the other hand, Aggregated Unplanned Stop Event 1112c has its First Fragment Event ID field set to 18, the ID of Production Metric Event 1101, because neither of the Unplanned Stop Events 1112a and 1112b that occur during Production Metric Event 1101 have Fragments in an earlier Production Metric Event.

Slices

Channel Boundary Relationships can create, or be combined to create, a set of Channels (referred to as a Slice Set) that share Boundaries in such a way that those Boundaries demarcate intervals of time (referred to as Slices) that contain the associated information for that interval of time. Each Slice can be given a unique identifier (referred to as a Slice ID), and each Event and Event Fragment that occurs within that Slice can contain the Slice ID of the Slice within which it occurred. Using the Slice ID, any Event or Event Fragment in the Slice Set can be easily related to the Slice in which it occurred.

Preferably, Slices are generated with the same Boundaries as a particular Channel (the Slice Parent Channel), in which case all other Channels in the Slice Set can be referred to as Slice Child Channels. When Slices are generated in this way, it is useful to apply the same language that is used with Events (e.g., Boundary, open, closed, etc.) to Slices. For example, in a preferred embodiment, the Production Metric Channel is a Slice Parent Channel, and so when an open Production Metric Event is closed, the associated open Slice is also closed, creating a new Slice Boundary.

Figure 12:
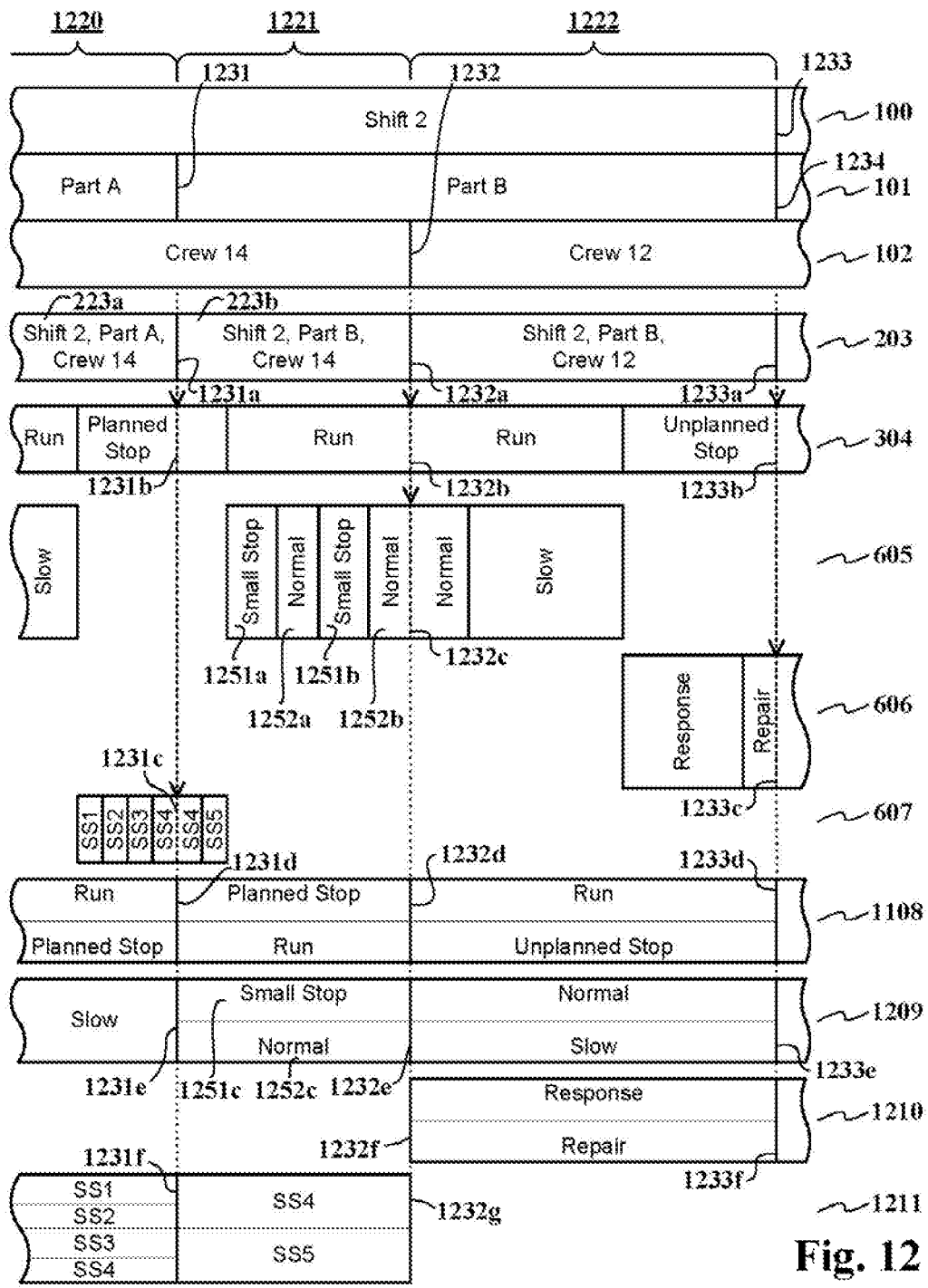
FIG. 12 shows a Slice Set from a preferred embodiment consisting of the Shift Channel, the Part Channel, the Crew Channel, the Production Metric Channel, the Production State Channel, the Performance Zone Channel, the Response Time Channel, the SMED Step Channel, the Aggregated Production State Channel, the Aggregated Performance Zone Channel, the Aggregated Response Time Channel, and the Aggregated SMED Step Channel.

An example of a Slice Set from a preferred embodiment is shown in FIG. 12. Production Metric Channel 203 is a Projecting Base Channel with a large number of Projecting Source Channels (Shift 100, Part 101, and Crew 102, as well as others not shown, e.g., Hour, Batch, Lot, SKU, Work Order, Customer, Tool, etc.).

Production State Channel 304, Performance Zone Channel 605, Response Time Channel 606, and SMED Step Channel 607 are Fragmenting Children of Production Metric Channel 203. Building on these relationships, they are also Aggregating Data Parents in Aggregation Sets with the Production Metric Channel 203 as the Aggregating Boundary Parent, resulting in Aggregated Production State Channel 1108, Aggregated Performance Zone Channel 1209, Aggregated Response Time Channel 1210, and Aggregated SMED Step Channel 1211.

When the Part Category Value in Part Channel 101 changes from "Part A" to "Part B," Boundary 1231 is created. Because Part Channel 101 is a Projecting Source Channel for Production Metric Channel 203, the Category Value change is recorded by closing Production Metric Event 223a and creating Production Metric Event 223b, which creates Boundary 1231a. This in turn closes Slice 1220.

Because Production Metric Channel 203 is a Fragmenting Parent of Production State Channel 304 and SMED Step Channel 607, closing Event 223a in Production Metric Channel 203 creates Fragment Boundary 1231b in Production State Channel 304 and Fragment Boundary 1231c in SMED Step Channel 607. Because there are no open Events in Performance Zone Channel 605 and Response Time Channel 606, nothing happens in those Channels.

Because Production Metric Channel 203 is an Aggregating Boundary Parent in Aggregation Sets with Production State Channel 304, Performance Zone Channel 605, and SMED Step Channel 607 as Aggregating Data Parents, the change of Category Value in Production Metric Channel 203 causes new Events to be created in: Aggregated Production State Channel 1108, with new Boundary 1231d; Aggregated Performance Zone Channel 1209, with new Boundary 1231e; and Aggregated SMED Step Channel 1211, with Boundary 1231f. Because there are no Events in Response Time Channel 606 that occur during Slice 1220, no new Aggregated Response Time Channel Event is created.

When the Crew Category Value in Crew Channel 102 changes from "Crew 14" to "Crew 12", Boundaries 1232 and 1232a are created. This closes Slice 1221. The change in Production Metric Channel 203 creates Boundaries 1232b and 1232c because of the associated Fragmenting Relationships.

This change also causes the creation of Boundaries 1232d, 1232e, and 1232g, along with the associated Aggregated Events (for the purposes of clarity and brevity, this and other examples are written with regard to a preferred embodiment in which Aggregated Events are created when the corresponding Boundary Parent Event is closed; it will be apparent to one skilled in the art that similar examples would be possible in other embodiments without departing from the spirit of the invention). For example, Aggregated Performance Zone Event 1251c is formed by aggregation of Performance Zone Events 1251a and 1251b; Aggregated Performance Zone Event 1252c is formed by aggregation of Performance Zone Events 1252a and 1252b. While Boundary 1232f is coincident with Boundary 1232, it is created when Slice 1222 is closed, because there were no Events in Aggregated Response Time Channel 1210 during Slice 1221.

When the Shift Category Value in Shift Channel 100 changes from "Shift 2" and Part Category Value in the Part Channel 101 changes from "Part B", Boundaries 1233 and 1234 are created at the same time, and Boundary 1233a is created in response. This closes Slice 1222. Boundaries 1233b and 1233c are created because of the associated Fragmenting Relationships, and Boundaries 1233d, 1233e, 1232f, and 1233f are created because of the associated Aggregating Relationships.

Relating Slices Between Manufacturing Processes

Many manufacturing companies have more than one manufacturing process, and it can be useful to aggregate, compare, or otherwise interrelate information from these processes. This interrelation of information may be complicated by the presence of discrepancies between either the processes or the information captured about those processes. For instance, a factory's first shift may not begin at the same time for every manufacturing process. Alternatively, geographically dispersed manufacturing sites may be affected by differences in Time Zones, Daylight Saving Time (DST) rules, or other factors. Such time-based or other types of discrepancies may make it difficult to align information from one process with information from another.

In order to mitigate these difficulties, a preferred embodiment may use shared Field values in order to relate Events across manufacturing processes. These Events may then be collated and meaningfully analyzed together. Furthermore, entire Slices or sets of Slices from different processes may be collated and analyzed together, using shared Channels and Channel Boundary Relationships.

An instructive example of relating Slices from different processes is the concept of a Production Day, which facilitates the comparison of daily process information gathered from different sites. For instance, consider two factories that both run a three-shift, 24/7 operation. One factory chooses to begin its first shift at 07:00, and another begins its first shift at 08:00. By mapping each Slice to a certain Production Day, and by beginning a new Production Day with the start of each factory's first shift, day-to-day information from the two factories can be compared directly because each factory's Production Day consists of three consecutive eight-hour shifts. This approach can also obviate the need for handling variations in Time Zones or DST rules.

In order to make use of this Production Day concept, a preferred embodiment may establish a Production Day Channel, serving as a Projecting Source Channel for the Production Metric Channel. By virtue of that Projecting Relationship, Events in the Projecting Base Channels of each process might share a Production Day Category by which they can be related. Depending on the embodiment's definition of the Production Day, the Category Value may change in response to any number of prompts: at a particular local time (such as 06:00), in response to some event in the manufacturing process (such as the start of the first shift), or even in response to some external event (such as a centralized network broadcast from the corporation's global headquarters).

Slice ID Creation

Slice IDs can be created from any practically unique key. Some example methods are:

Generate UUIDs for each Slice, for example, by using one of the standard methods described in IETF RFC 4122;

Compute a strong message digest (e.g., SHA-2) over all of or some subset of the data in the Slice;

Use a monotonically increasing index (a sequence number). If interacting with other instances of the Process Data Model, some method of ensuring that the sequence number is unique among other instances is necessary (e.g., a Slice ID range reservation system, where a given instance reserves a large range of increasing Slice IDs from a central server); etc.

Timestamps are less desirable keys, because they are not necessarily unique even within a single instance of the Process Data Model: clocks drift over time; it is easy for human error to invalidate time in a system; NTP servers can "correct" time incorrectly; clock correction can cause overlaps if the time "jumps" backward; Daylight Saving Time can cause overlaps if tracking in local time (as can correcting previously incorrect Time Zone or Daylight Saving Time settings); etc.

Methods chosen to generate Slice IDs can also be used to generate Event IDs. If the two methods are equivalent, and if there is a Slice Parent Channel, Event IDs from the Events of the Slice Parent Channel can be used as Slice IDs.

For example, in a preferred embodiment, the Production Metric Channel is a Slice Parent Channel, uses a UUID as its Event ID, and this UUID is then referenced from every other Event within a given Slice.

Schema

Figure 13:
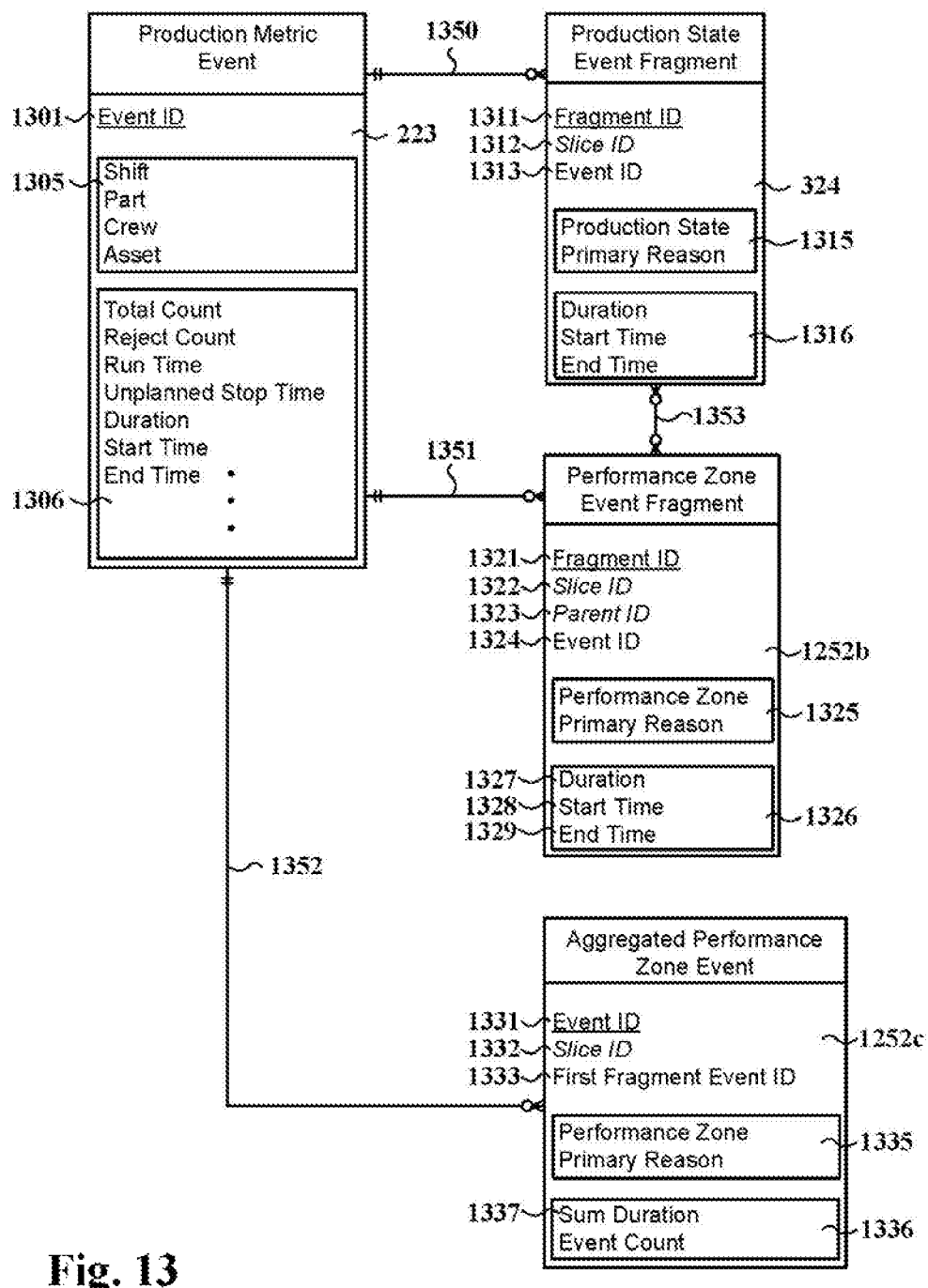
FIG. 13 shows an example of a database schema for a preferred embodiment that illustrates one way Channel information could be stored in a database.

A database schema that illustrates relationships between Events in one embodiment is shown in FIG. 13. This schema and many other possible schemas are suitable for use on resource-constrained embedded devices, non-resource-constrained devices, general-purpose computers, and combinations thereof. Additionally, the database using this schema (as well as other means of storing captured information in a format or structure consistent with this invention) can be embodied within resource-constrained embedded devices, non-resource-constrained devices, general-purpose computers, and combinations thereof.

In the database schema of FIG. 13, Production Metric Event 223 contains a primary key field Event ID 1301, which also serves as the Slice ID. It also contains a set of Categories 1305 and a set of Metrics 1306.

Because of the Fragmenting Relationship between Production Metric Channel 203 and Production State Channel 304, Production Metric Event 223 has a one-to-many relationship 1350 with Production State Event Fragment 324; relationship 1350 is implemented as a foreign key mapping from Slice ID 1312 to Event ID 1301.

Production State Event Fragment 324 also contains a primary key field, Fragment ID 1311, a System Field Event ID 1313 (which can be used to combine Fragments back into Events), a set of Category Value Fields 1315, and a set of Metrics 1316. Note that Production State Event Fragment 324 can represent either an Event Fragment or an Event.

Because of the Fragmenting Relationship between Production Metric Channel 203 and Performance Zone Channel 605, Production Metric Event 223 has a one-to-many relationship 1351 with Performance Zone Event Fragment 1252*b*; relationship 1351 is implemented as a foreign key mapping from Slice ID 1322 to Event ID 1301. Additionally, because of the Coupling Relationship between Production State Channel 304 and Performance Zone Channel 605, Production State Event Fragment 324 has a many-to-many relationship 1353 with Performance Zone Event Fragment 1252*b*, which is implemented as a foreign key mapping from Parent ID 1323 to Event ID 1313.

Performance Zone Event Fragment 1252*b* also contains a primary key field Fragment ID 1321, a System Field Event ID 1324 (which can be used to combine Fragments back into Events), a set of Category Value Fields 1325, and a set of Metrics 1326. Note that Performance Zone Event Fragment 1252*b* can represent either an Event Fragment or an Event.

Because of the Aggregating Relationship between Production Metric Channel 203 and Aggregated Performance Zone Channel 1209, Production Metric Event 223 has a one-to-many relationship 1352 with Aggregated Performance Zone Event 1252*c*; relationship 1352 is implemented as a foreign key mapping from Slice ID 1332 to Event ID 1301.

Aggregated Performance Zone Event Fragment 1252*c* also contains a primary key field Event ID 1331, a System Field First Fragment Event ID 1333 (which is used to avoid counting multiple Fragments of the same Event as if they were separate Events, as described earlier), a set of Category Value Fields 1335, and a set of Metrics 1336.

The Duration 1327 of Performance Zone Event Fragment 1252*b* is summed during the aggregation process, and the result is stored in Sum Duration 1337 of Aggregated Performance Zone Event 1252*c*. Start Time 1328 and End Time 1329 of Performance Zone Event Fragment 1252*b* are dropped during the aggregation process because the information is not useful in the context of Aggregated Performance Zone Event 1252*c*.

Response Time Channel 606 and SMED Step Channel 607 have the same structure and relationships as Performance Zone Channel 605. Aggregated Response Time Channel 1210 and Aggregated SMED Step Channel 1211 have the same structure and relationships as Aggregated Performance Zone Channel 1209.

The Fields Event ID 1301, Fragment ID 1311, Slice ID 1312, Event ID 1313, Fragment ID 1321, Slice ID 1322, Parent ID 1323, Event ID 1324, Event ID 1331, and Slice ID 1332 are typically used as keys, or to relate Events to other Events, or some combination of the two.

Category Value Fields in sets 1305, 1315, 1325, and 1335 are typically used for relational selection and projection, as well as for grouping, but not for relational joins; connecting tables is typically done through the keys listed above.

Metrics in sets 1306, 1316, 1326, and 1336 are typically used for relational selection and projection. Grouping and joining using Metrics is usually either not reliable (e.g., Start Time 1328 and End Time 1329), not useful (e.g., "How much Unplanned Stop Time occurred during shifts over the last month that produced exactly 423 pieces?"), or both.

Exploration Hierarchies

Exploration Hierarchies are a form of Category Analysis that enables users to view, analyze, interpret, understand, and otherwise benefit from Metrics while traversing a group of Categories. In a preferred embodiment, "Plant>Line>Shift>Part>Production State>Primary Reason" is an example of an Exploration Hierarchy.

While it is possible to allow users to construct Exploration Hierarchies with any sets of Categories and Metrics, many such Exploration Hierarchies will not be meaningful. Therefore, it is beneficial to create meaningful Exploration Hierarchies from programmatic rules.

An example of a set of rules that governs how to build Exploration Hierarchies is based on Channel Hierarchies, each of which is an ordered list of Channels. For example, in a preferred embodiment, "Production Metric>Production State>Performance Zone" is an example of a Channel Hierarchy. When discussing a Channel Hierarchy, we can say that Channels to the right are "lower" or "lower in hierarchy" than Channels to the left. A way to construct Channel Hierarchies using Channel Boundary Relationships is described later.

In this example set of rules, the set of Categories for the Exploration Hierarchy can be built using any Base Category from any Channel in the Channel Hierarchy or any Derived Category associated with any of those Base Categories. For example, in a preferred embodiment, the Exploration Hierarchy "Plant>Line>Shift>Part>Production State>Primary Reason" can be created from the Channel Hierarchy "Production Metric Channel>Production State Channel". The Categories used in the Exploration Hierarchy do not have to be in the order of their respective Channels; they can be in any order. For example, in a preferred embodiment, the Channel Hierarchy "Production Metric>Production State" can be used to generate both "Shift>Production State" and "Production State>Shift" Exploration Hierarchies.

When traversing an Exploration Hierarchy built with these rules, a particular Channel has been "Visited" when any Category associated with that Channel has been traversed. The Metrics that can be shown to the user at any given level of the Exploration Hierarchy can be taken from the lowest Visited Channel or any Channels that are lower than the lowest Visited Channel in the Channel Hierarchy.

Drilldown and Rollup

In Drilldown, an Exploration Hierarchy is traversed from left to right, adding filters as the traversal continues. For example, in a preferred embodiment, a user might be viewing a table containing three rows, one each for First Shift, Second Shift, and Third Shift. They might click on Second Shift and be taken to a new table containing a list of Parts run during Second Shift, with Metrics aggregated from Part runs that occurred during Second Shift. Then the user might click on a specific Part and be taken to a report analyzing down time of that Part for Part runs that occurred during Second Shift. Each step in the Drilldown process shows the user an interval of time (or aggregated amount of time) that is equal to or less than the previous step.

In Rollup, an Exploration Hierarchy is traversed from right to left, aggregating Metrics as the traversal continues. For example, a user might be viewing a table containing one row for each Unplanned Stop Event during a particular span of time. They might move left in the Exploration Hierarchy and be taken to a new table containing one row for each Shift, with Metrics aggregated from all the Unplanned Stop Events in each Shift. Moving left in the Exploration Hierarchy again might take them to a new table containing one row for each Line in their enterprise, with Metrics aggregated from the Unplanned Stop Events for all Shifts on the Line. Moving left in the Exploration Hierarchy a third time might then take them to a new table containing one row for each Region, with Metrics aggregated from the Unplanned Stop Events from all Shifts on all Lines in the Region. Each step in the Rollup process shows the user an interval of time (or aggregated amount of time) that is greater than or equal to the previous step. Rollup can also be thought of as un-traversing, in that generally the Exploration Hierarchy is first traversed from left to right as described in Drilldown in order to determine the available Metrics for Rollup.

Respectful Channel Hierarchies

Channel Hierarchies (and the Exploration Hierarchies built from them) are particularly useful if the Channels in the hierarchy are ordered so that lower Channels respect the Boundaries of higher Channels. These can be called "Respectful Channel Hierarchies".

Channel B respects the Boundaries of another Channel A if the time represented by each Event Fragment or non-fragmented Event in Channel B falls entirely within the Boundaries represented by a single Event of Channel A, or falls entirely outside the Boundaries of any Event in Channel A.

In an embodiment using the system of Channel Boundary Relationships previously described, Channel B respects the Boundaries of Channel A if any of the following are true:

Channel A is a Fragmenting Parent of Channel B.

Channel A is a Coupling Parent of Channel B.

Channel A is a Projecting Source Channel in a Projecting Set and Channel B is the Projecting Base Channel in that same Projecting Set.

Channel A is a Projecting Source Channel in a Projecting Set and Channel B respects the Boundaries of the Projecting Base Channel in that same Projecting Set.

Channel A is the Aggregating Boundary Parent in an Aggregating Set, and Channel B is the associated Aggregating Child Channel.

Figure 14:
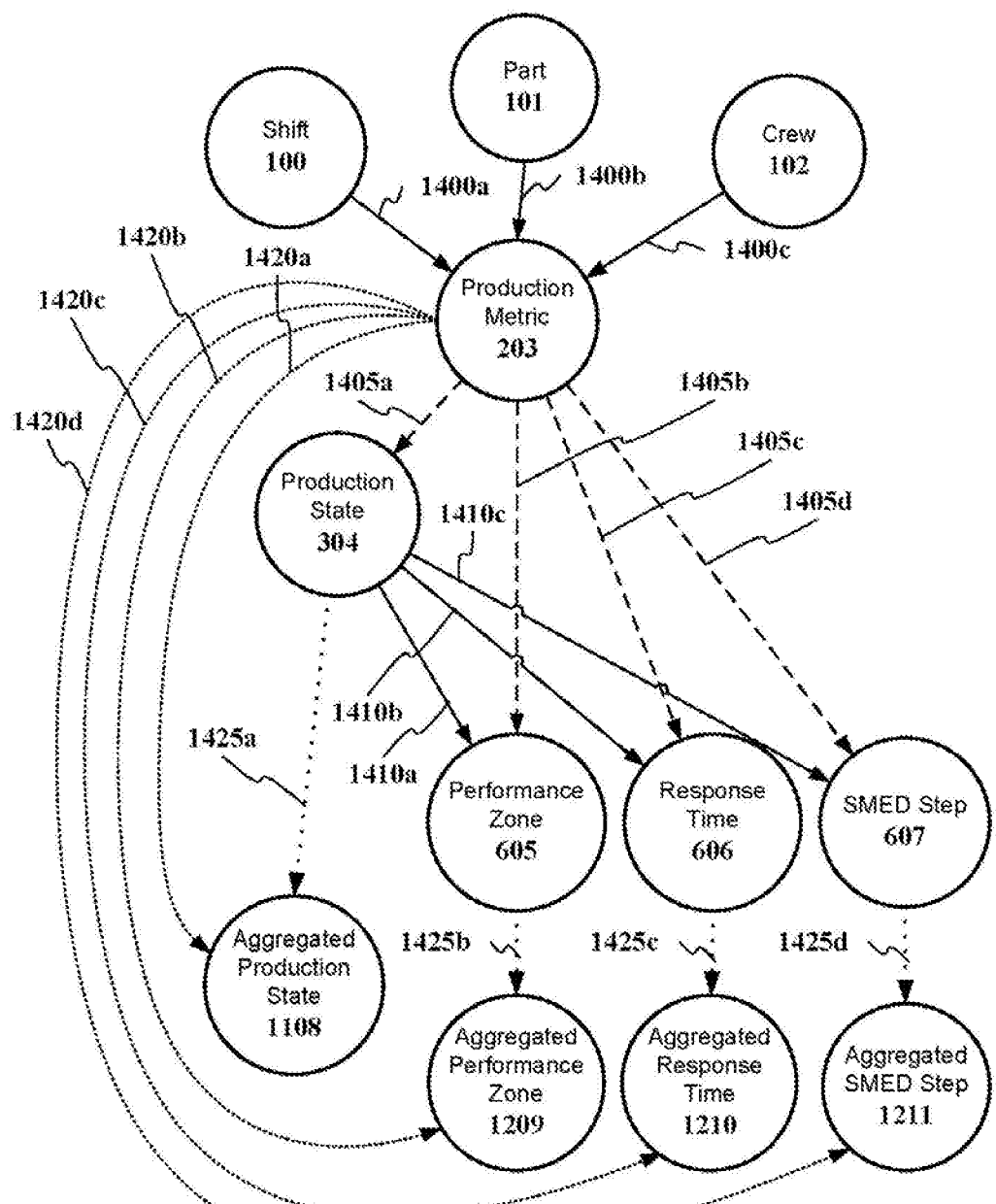
FIG. 14 shows a directed graph of a set of Channels from a preferred embodiment, illustrating their Channel Boundary Relationships (Coupling, Fragmenting, Projecting, and Aggregating).

Examples from a preferred embodiment of Channels that respect the Boundaries of other Channels can be seen in FIG. 14. Shift Channel 100, Part Channel 101, and Crew Channel 102 are all Projecting Source Channels for a Projecting Base Channel, Production Metric Channel 203, as shown by Projecting Relationships 1400a, 1400b, and 1400c, so Production Metric Channel 203 respects the Boundaries of all three Projecting Source Channels.

Production Metric Channel 203 is a Fragmenting Parent for Production State Channel 304, Performance Zone Channel 605, Response Time Channel 606, and SMED Step Channel 607, as shown by Fragmenting Relationships 1405a, 1405b, 1405c, and 1405d, so Production State Channel 304, Performance Zone Channel 605, Response Time Channel 606, and SMED Step Channel 607 respect the Boundaries of Production Metric Channel 203, and consequently also respect the Boundaries of Shift Channel 100, Part Channel 101, and Crew Channel 102.

Production State Channel 304 is a Coupling Parent for Performance Zone Channel 605, Response Time Channel 606, and SMED Step Channel 607, as shown by Coupling Relationships 1410a, 1410b, and 1410c, so Performance Zone Channel 605, Response Time Channel 606, and SMED Step Channel 607 also respect the Boundaries of Production State Channel 304.

Production Metric Channel 203 is an Aggregating Boundary Parent for Aggregated Production State Channel 1108 (with Production State Channel 304 as Aggregating Data Parent), Aggregated Performance Zone Channel 1209 (with Performance Zone Channel 605 as Aggregating Data Parent), Aggregated Response Time Channel 1210 (with Response Time Channel 606 as Aggregating Data Parent), and Aggregated SMED Step Channel 1211 (with SMED Step Channel 607 as Aggregating Data Parent), as shown by Aggregating Boundary Relationships 1420a, 1420b, 1420c, and 1420d and Aggregating Data Relationships 1425a, 1425b, 1425c, and 1425d, so Aggregated Production State Channel 1108, Aggregated Performance Zone Channel 1209, Aggregated Response Time Channel 1210, and Aggregated SMED Step Channel 1211 respect the Boundaries of Production Metric Channel 203 and its Projecting Source Channels, namely Shift Channel 100, Part Channel 101, and Crew Channel 102.

While Channel Boundary Relationship information is helpful in determining, programmatically or otherwise, whether one Channel respects the Boundaries of another Channel, other information about the Channels can be used instead. For example, a table could be manually created that lists all the Channels that respect the Boundaries of a given Channel.

Explicitly Generating Respectful Channel Hierarchies

In one embodiment, users may create a Channel Hierarchy by explicitly selecting Channels for that Channel Hierarchy. Any Channel can be selected as the top Channel in the Hierarchy. Any other Channel that respects the Boundaries of the top Channel can be added as the next Channel in the Hierarchy. This can continue by adding additional Channels to the bottom of the Hierarchy as long as each Channel added respects the Boundaries of every Channel that was already added.

The following algorithm is an example of one way to accomplish this, by ensuring that, at each step of creation of the Hierarchy, the only Channels that may be chosen respect the Boundaries of all the Channels that are currently in the Channel Hierarchy:

```
Channels = initially the set of all Channels
CH = initially an empty list // Channel Hierarchy being built
while Channels is not the empty set and the user wants to add to CH:
    C = a Channel the user chooses from Channels
    put C at the end of CH
    remove C from Channels
    for each Channel "N" in Channels:
        if N does not respect the Boundaries of C:
            remove N from Channels
        end if
    end for
end while
```

Implicitly Generating Respectful Channel Hierarchies

In another embodiment, users may select Categories for an Exploration Hierarchy, which implicitly creates a Channel Hierarchy. Initially, any Category can be selected for inclusion in the Exploration Hierarchy. The Channel containing that Category becomes the top Channel in the Channel Hierarchy. Additional Categories can be selected for inclusion in the Exploration Hierarchy, as long as the Category is within a Channel already contained in the Channel Hierarchy or the Category is within any other Channel that can be inserted into the Channel Hierarchy such that lower Channels respect the Boundaries of higher Channels. If the Category is within a Channel already contained in the Channel Hierarchy, the Channel Hierarchy remains unchanged. Otherwise, the Channel is inserted into the Channel Hierarchy such that the inserted Channel respects the Boundaries of all Channels above it and all Channels below the inserted Channel respect its Boundaries.

The following algorithm is an example of one way to accomplish this, by ensuring that, at each step of creation of the Exploration (and Channel) Hierarchy, the only Categories that may be chosen are those that occur in Channels in a Respectful Channel Hierarchy.

```
Channels = initially the set of all Channels
Categories = initially the set of Categories in any Channel in Channels
EH = initially an empty list // Exploration Hierarchy being built
CH = initially an empty list // Channel Hierarchy being built
while Categories is not the empty set and the user wants to add to EH:
    Cat = a Category the user chooses from Categories
    Chan = the Channel containing Cat
    // Add chosen Category to Exploration Hierarchy and remove it from
    the
    // Categories the user can choose
    put Cat at the end of EH
    remove Cat from Categories
    // Unless we've already added it to the Channel Hierarchy, put the
    // Channel containing the chosen Category in the Channel Hierarchy
    // in the correct place.
    if Chan is not already in CH:
        for each Channel "X" in CH, starting at the beginning:
            if X respects the boundaries of Chan:
                // Then Chan must come before X in the Channel
                Hierarchy insert Chan into CH before X
                break
            end if
        end for
    end if
    // If no Channel already in the Channel Hierarchy respects the
    // boundaries of Chan, it must belong at the end of Channel Hierarchy
    if Chan has not been inserted into CH, put Chan on the end of CH
    // Remove any Channel that would allow the user to create a
    // non-Respectful Channel Hierarchy from Channels, and remove its
    // Categories from the Categories set
    for each Channel "N" in Channels:
```

-continued

```
State = Respecting
for each Channel "X" in CH:
        if State = Respecting and N respects the Boundaries of X:
                continue
        else if State = Respecting and X respects the Boundaries of
                N:
                State = Respected
                continue
        else if State = Respected and X respects the Boundaries of
                N:
                continue
        else:
                remove N from Channels
                remove all Categories in N from Categories
                break
        end if
    end for
end for
end while
```

The above algorithm assumes that each Category only occurs in a single Channel. One way to extend the algorithm is to remove this assumption by making the "Categories" set a set of pairs of (Category, Channel), where "Channel" is the Channel in which the Category occurs. The above algorithm also prevents Categories from being repeated in the Exploration Hierarchy; extending the algorithm to allow repeated Categories is also possible.

It will be obvious to one skilled in the art how to use other algorithms to verify the Respectfulness of a Channel Hierarchy as well as to programmatically generate Respectful Channel Hierarchies and Exploration Hierarchies.

Aggregating and Conditional Coupling

When creating an Aggregating Child Channel, some of the Data Parent Channel's Boundaries may be lost. Because of this potential loss, in general, including an Aggregating Child Channel in a Channel Hierarchy as anything other than the lowest Channel does not result in a Respectful Channel Hierarchy. However, if two Channels that are related by Category Based Conditional Coupling using a single Category Value are aggregated (as Aggregating Data Parents) using the same Aggregating Boundary Parent, then the aggregated form of the Conditional Coupling Parent can be used in limited ways to create a Respectful Channel Hierarchy.

More specifically, the Aggregated Conditional Coupling Parent Channel can be placed in a Respectful Channel Hierarchy immediately before the Aggregated Conditional Coupling Child Channel, but the only Category that can be used from the Aggregated Conditional Coupling Parent Channel is that used to enable the Category Based Conditional Coupling. For example, in a preferred embodiment, a Respectful Channel Hierarchy could be made containing "Aggregated Production State>Aggregated Performance Zone", but the only Category from the Aggregated Production State Channel that could be used when exploring the Aggregated Performance Zone Channel using this Respectful Channel Hierarchy is the Production State Category, because the Performance Zone Channel is Conditionally Coupled to the Production State Channel when the Production State Category Value is "Run". Multiple Conditional Coupling Relationships may be used like this in the same Exploration Hierarchy; for example, this could be done to create an Exploration Hierarchy in which Drilldown from the Aggregated Production State Channel could take the user to any of the Aggregated Performance Zone Channel, Aggregated Response Time Channel, or Aggregated SMED Step Channel, depending on the Production State used for the Drilldown ("Run", "Unplanned Stop", or "Planned Stop" respectively).

With additional information about the structure of the data, additional rules can be devised in order to allow the use of Channels that are Conditionally Coupled over more than one Category or Category Value to be used in Respectful Channel Hierarchies.

Hierarchy Types

The Channel Boundary Relationships of every pair of Channels can be examined to determine how those Channels can be put in a Channel Hierarchy with each other. The result of this examination can be referred to as the Hierarchy Type for that pair of Channels.

Bidirectional Hierarchy means the two Channels can be put in hierarchy with each other with either Channel serving as the Parent. Every Channel is considered to be in Bidirectional Hierarchy with itself.

Unidirectional Hierarchy means the two Channels can be put in a hierarchy with each other but only one of the two Channels can be the Parent (the other must always be the Child).

Null Hierarchy means that two Channels cannot be put in hierarchy with each other.

Channel Boundary Relationships and Hierarchy Types

Coupling Relationships and Fragmenting Relationships provide Unidirectional Hierarchy between their Parent and Child Channels. For example, in a preferred embodiment, "Production Metric>Production State" is a valid Channel Hierarchy, but "Production State>Production Metric" is not, because the Unidirectional Hierarchy between the two Channels does not support that direction.

Aggregating Relationships provide Unidirectional Hierarchy between Boundary Parents and Aggregating Children. This is because the Child in an Aggregation Set represents the Data Parent within the Boundaries of the Boundary Parent but shares the Boundaries of the Boundary Parent in limited ways.

Projecting Relationships provide Unidirectional Hierarchy between the Base Channel and all its associated Source Channels (where each Source Channel can be a Parent). This is because the Base Channel shares all of the Boundaries of its Source Channels, but any given Source Channel may not contain all of the Boundaries of the Base Channel. The Source Channels have Null Hierarchy with each other unless another kind of Channel Boundary Relationship exists between them. However, Projecting Relationships have a very interesting property. Any time a Source Channel can be used in a Channel Hierarchy, the Base Channel may be used instead. This provides the ability to build Exploration Hierarchies using all of the Categories from all of the Source Channels, as if they were in Bidirectional Hierarchy with each other.

Channels that do not have Channel Boundary Relationships with each other have Null Hierarchy.

Extension Information

It can be useful to define certain types of information (e.g. the Production Metric Channel) as always being present in a given embodiment of the Process Data Model (referred to as Standard Information). It can also be useful to allow Users (e.g., end users, consultants, partner companies, or OEMs) to define additional information (referred to as Extension Information) that is above and beyond Standard Information. Examples of Extension Information include new Channels, new Fields (e.g., Metrics, Category Values, and Annotations), etc.

It can also be useful to store Extension Information separately from Standard Information. This provides various benefits over storing it together. For example, if the structure of Standard Information changes the structure of Extension Information does not have to change (and vice versa); Standard Information and Extension Information can be discarded at different rates; etc.

Storing Category Values

In many cases, new Category Values will be defined by users (e.g., in a preferred embodiment, each manufacturing operation will have its own list of parts that it produces) and existing Category Values will be modified. This can create difficulties for the long-term storage of Events that contain Category Values.

One example of such a difficulty comes from Category Values that are short pieces of text entered by the users of the system. Over time, users may have reason to change these pieces of text without changing the Category Value's underlying meaning. For example, the values for the Shift Category might be changed from "Shift 1", "Shift 2", and "Shift 3" to "First Shift", "Second Shift", and "Third Shift". Since "First Shift" is conceptually the same as "Shift 1", it is desirable for users to be able to look at, for example, information stored both before and after the change and see it all under the name "First Shift".

One way to accomplish this is to store two pieces of text for each Category Value instead of one. For example, the first piece of text may be the name originally given to the Category Value (referred to as the "Key Name"); once set, it does not change. The second piece of text (referred to as the "Display Name") may initially be the same as the Key Name, but can be freely changed over time. The Display Name is what users typically see when looking at the Category Value. Using the example above, when the "Shift 1" Category Value is created, both its Key Name and Display Name are set to "Shift 1". When a user later changes the text to "First Shift", only the Display Name changes; the Key Name continues to be "Shift 1". "Shift 1" and "First Shift" can then be recognized as conceptually the same thing because they share a Key Name. Another advantage is that changes to Category Value text do not need to update every use of the Category Value; they only need to update the association between the Key Name and the Display Name.

Since a large number of Category Values are likely to be stored, it can be advantageous to store them in a form that is more space-efficient than simple text, particularly for resource-constrained embedded devices. For example, each Category Value could have an integer value called "Key ID", which is used to represent the Key Name when stored in Events (a 4-byte integer offers over four billion possible values, is deterministic in its space requirements, and will typically use substantially less storage than its associated Key Name).

Unlike the Key Name, the Key ID has no intrinsic meaning for users of the system; as such, it can be advantageous to have both a Key Name and a Key ID. For example, when an embodiment has very limited storage capacity, users may choose to extract historical information and store it elsewhere. In such cases, users may find it significantly easier to line up the information stored in the system with the information stored externally using Key Names because of their intrinsic meaning.

Once a Key Name or Key ID has been used, it is important to prevent it from being used again within that Category, to avoid confusion over which Category Value was intended (both by users and by the system itself). One way of dealing with this is to ensure that Key Names and Key IDs are never discarded once they are created. It can then also be advantageous to allow users to mark certain Category Values as "hidden", such as when a single Category Value is divided into multiple Category Values and the original Category Value is retired to avoid accidental usage (e.g., Part "84-98423" is divided into variations "84-98423-A", "84-98423-B", and "84-98423-C").

One way of creating Key IDs is to apply a hash function to the Key Name. In many cases, this will be sufficient to ensure that each Key ID is unique, and the kind of additional measures discussed above would not be required (if it is assumed that the hash function distributes values evenly, a 4-byte integer would require 9,292 Key IDs for there to be even a 1% chance of a collision; for an 8-byte integer, it would require 609 million Key IDs to reach a 1% chance of a collision). Methods of dealing with hash collisions are well-known in the art and are not further discussed here.

Memory Management Policies

Users can be provided options for tuning memory management of the Channel and Event system (referred to as Memory Management Policies). These policies are typically most useful for resource-constrained embedded devices; an external database is likely to have orders of magnitude more memory and processing power and may be able to store the complete information.

Memory Management Policies may be applied to volatile storage media, non-volatile storage media, or both. It is also possible to have different sets of Memory Management Policies for the two. In some embodiments, all data is loaded from non-volatile memory to volatile memory at startup time. In these embodiments, if more non-volatile memory is available than volatile memory, Memory Management Policies may be implemented non-destructively by applying them to volatile memory upon startup.

Examples of Memory Management Policies Include:

Aggregating, which creates Aggregated Events from an Aggregating Boundary Parent Channel and an Aggregating Data Parent Channel as described above. Once information is aggregated it can be dropped from the Aggregating Data Parent Channel.

Prioritizing, which enables less important information to be automatically discarded based on criteria like time horizon, available memory, when aggregation is applied, etc. Examples of information that could be automatically discarded include a subset of Events from designated Channels (e.g., based on Category Values or other logical criteria), designated Metrics within a Channel, designated Categories in Channels with multiple Category Value Fields, designated Annotations within a Channel, etc.

Horizon Balancing, which enables modification of the amount of memory allocated to each Time Horizon Group in the system.

Channel Balancing, which allows modification of the amount of memory allocated for each Channel.

Event Debouncing

Event Debouncing is a technique for reducing the total number of Boundaries in a set of Channels, increasing the number of shared Boundaries between Channels, or both. It can also play an important role in making manufacturing process information easier to understand and analyze. Event Debouncing may be configured for a single Channel, for various combinations of Channels, or for all Channels.

To illustrate the benefits of Event Debouncing, consider the following example: a new Shift (Shift 3) is started and five seconds afterwards the operator provides notification of changing from Part B to Part C. In the absence of an Event Debouncing policy, this may result in two new Slices, one when the Shift starts and one when the Part changes, in a circumstance where both were intended to change simultaneously. With these two Slices, later analysis would show that Part B was in production at the start of Shift 3, which could be erroneous, misleading, or otherwise confusing.

With Event Debouncing, when something prompts the creation, modification, or elimination of a Boundary, the embodiment may elect (based on its configuration and recent history) to not create one or more Boundaries, to adjust one or more Boundaries backward in time, to postpone one or more Boundaries for a period of time, or to otherwise modify or eliminate one or more Boundaries (in some cases aligning Boundaries within one Channel to collapse two or more Events or Event Fragments into one and in other cases aligning Boundaries between two or more Channels). A simple example of an algorithm for Event Debouncing may involve configurable time thresholds for Channels or combinations of Channels within which Event Debouncing is applied. It will be apparent to one skilled in the art that many other algorithms may be devised to implement Event Debouncing.

As mentioned above, Event Debouncing may increase the number of shared Boundaries between Channels. Referring to FIG. 12, for instance, Event Debouncing may be configured such that Event Boundary 1234 of Part Channel 101 is retroactively aligned with Event Boundary 1233 of Shift Channel 100, making it appear that the Shift and the Part changed simultaneously, better reflecting the reality of the example manufacturing process.

Additionally, Event Debouncing may reduce the total number of Boundaries in a set of Channels. Continuing with the earlier example, and referencing the preferred embodiment, if Event Boundary 1234 and Event Boundary 1233 are aligned through Event Debouncing, only one new Boundary is created in Production Metric Channel 203. As a result, the Fragmenting Children of Production Metric Channel 203 (including Production State Channel 304, Performance Zone Channel 605, Response Time Channel 606, and SMED Step Channel 607) need only fragment their Events once, which means there are fewer Fragment Boundaries. Similar logic applies to the Aggregated Child Channels of Production Metric Channel 203 (including Aggregated Production State Channel 1108, Aggregated Performance Zone Channel 1209, etc.). In this way, Event Debouncing can reduce the storage requirements of an embodiment, extending one or more of its time horizons.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for organizing manufacturing process information for analysis in a way that reduces memory requirements and improves query performance, the method comprising the following steps of:
   capturing information from a manufacturing process;
   organizing at least some of the captured information as a projection set, the projection set comprising:
      a plurality of projecting source channels, each of the plurality of projecting source channels comprising at least one channel event having at least one category and at least one boundary; and
      a projecting base channel;
   creating a new projecting base channel event from the captured information each time a value of a projecting source channel event category changes, wherein the projecting base channel contains information to recreate the plurality of projecting source channels and the captured information includes one or more accumulating metrics comprising numeric values of measurements of the manufacturing process that are aggregated by summation;
   storing the new projecting base channel event to a storage medium; and
   re-generating, as needed, the plurality of projecting source channels, including all projecting source channel event boundaries, from the stored projecting base channel event.

2. The method of claim 1, further comprising a step of performing category analysis on the manufacturing process using the re-generated plurality of projecting source channels.

3. The method of claim 1, further comprising a step of increasing shared boundaries through channel boundary relationships selected from a group of processes consisting of coupling, conditional coupling, fragmenting, and aggregating.

4. The method of claim 3, wherein the channel boundary relationships create a set of channels that share boundaries which demarcate intervals of time, wherein the intervals of time contain captured information for the created set of channels.

5. The method of claim 4, wherein the projecting base channel is a parent to one or more fragmenting channels and the projecting base channel serves as a slice parent which demarcates an interval of time.

6. The method of claim 1, wherein a boundary in one event is created, modified, or eliminated, based on the creation, modification, or elimination of a boundary in another event, such that the two boundaries occur at substantially the same point in time.

7. The method of claim 1, further comprising a step of event debouncing to either reduce a number of boundaries in a set of channels, increase a number of shared boundaries between channels, or both.

8. The method of claim 7, wherein the step of event debouncing comprises at least one of the following steps selected from a group consisting of electing to not create one or more boundaries, postponing one or more boundaries for a period of time, modifying one or more boundaries, and eliminating one or more boundaries.

9. The method of claim 1, wherein channel events comprise fields that store individual pieces of information, the information being selected from a group consisting of metrics, category values, annotations, and system fields.

10. The method of claim 9, further comprising a step of deriving additional information from information stored in fields, the additional information being selected from a group consisting of derived metrics, derived categories, and derived category values.

11. The method of claim 10, wherein the additional information further comprising a category value hierarchy defined by relationships between base category values and derived category values.

12. The method of claim 9, wherein the individual pieces of information comprise category values and the category values are stored as a key name, display name, and key ID.

13. The method of claim 1, wherein each channel event comprises one or more event fragments, each event fragment containing at least one fragment boundary.

14. The method of claim 1, further comprising a step of creating exploration hierarchies from channels, categories, and metrics, wherein the categories are in any order and the metrics are selected based on the categories and associated channels that have been traversed.

15. The method of claim 14, wherein channels in each of the exploration hierarchies are ordered so that each event of a lower channel B falls either entirely within boundaries of a single event or entirely outside boundaries of any event of higher channel A by a relationship selected from a group consisting of:
- channel A is a fragmenting parent of channel B;
- channel A is a coupling parent of channel B;
- channel A is a projecting source channel in a projecting set and channel B is the projecting base channel in the projecting set; and
- channel A is the aggregating boundary parent in an aggregating set and channel B is the associated aggregating child channel.

16. The method of claim 14, wherein the exploration is hierarchies are traversed to implement drilldown and rollup.

17. The method of claim 1, wherein the plurality of projecting source channels within the projection set are used in exploration hierarchies as if they are in a bidirectional hierarchy with each other.

18. The method of claim 1, wherein shared field values relate events across manufacturing processes such that they are collated and analyzed together using shared channels and channel boundary relationships.

19. The method of claim 18, wherein a production day is a shared field value used to relate events across the manufacturing processes.

20. The method of claim 1, wherein the plurality of channels comprises at least one channel selected from a group consisting of shift channel, job channel, part channel, crew channel, production crew channel, hour channel, batch channel, lot channel, SKU channel, work order channel, customer channel, tool channel, production day channel, production metric channel, production state channel, cycle channel, performance zone channel, response time channel, SMED step channel, aggregated cycle channel, aggregated production state channel, aggregated performance zone channel, aggregated response time channel, and aggregated SMED step channel.

21. The method of claim 1, wherein the plurality of projecting source channels comprises at least one new channel consisting of one of either:
- an additional channel; and
- an existing channel extended with additional fields;
- wherein the additional channel and the additional fields are defined by one of an end user, a consultant, a partner company, or a manufacturer.

22. The method of claim 1, further comprising the following steps of:
- establishing time horizons; and
- using a memory management policy to manage the storage medium;
- wherein the memory management policy is selected from a group of processing consisting of aggregating, prioritizing, horizon balancing, and channel balancing.

* * * * *